(12) United States Patent
Chen et al.

(10) Patent No.: US 9,274,309 B2
(45) Date of Patent: Mar. 1, 2016

(54) MOBILE DEVICE AND OPTICAL IMAGING LENS THEREOF

(71) Applicant: GENIUS ELECTRONIC OPTICAL CO., LTD., Taichung (TW)

(72) Inventors: Shih Han Chen, Taichung (TW); Jia Sin Jhang, Taichung (TW); Chung Chih Chang, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/194,096

(22) Filed: Feb. 28, 2014

(65) Prior Publication Data

US 2015/0070579 A1    Mar. 12, 2015

(30) Foreign Application Priority Data

Sep. 6, 2013   (CN) .......................... 2013 1 0402978

(51) Int. Cl.
*G02B 9/62* (2006.01)
*G02B 13/00* (2006.01)
*G03B 17/12* (2006.01)

(52) U.S. Cl.
CPC .............. *G02B 9/62* (2013.01); *G02B 13/0045* (2013.01); *G03B 17/12* (2013.01)

(58) Field of Classification Search
CPC ......... G02B 9/62; G02B 9/64; G02B 13/0045

USPC .......................... 359/713, 754–757, 759–762
See application file for complete search history.

(56) References Cited

U.S. PATENT DOCUMENTS

| 8,054,562 | B2 | 11/2011 | Asami |
| 8,345,354 | B2 | 1/2013 | Yamamoto |
| 2012/0188654 | A1 | 7/2012 | Huang |
| 2012/0194726 | A1 | 8/2012 | Huang et al. |
| 2012/0314304 | A1* | 12/2012 | Huang ........................... 359/759 |
| 2014/0043695 | A1 | 2/2014 | Hsu et al. |
| 2014/0063323 | A1* | 3/2014 | Yamazaki et al. ............. 348/335 |
| 2014/0078603 | A1* | 3/2014 | You ................................ 359/738 |
| 2015/0049393 | A1* | 2/2015 | Park, II ......................... 359/713 |

FOREIGN PATENT DOCUMENTS

| TW | 201250283 A1 | 12/2012 |
| TW | 201303412 A1 | 1/2013 |
| TW | 201312155 A1 | 3/2013 |

* cited by examiner

*Primary Examiner* — Darryl J Collins
(74) *Attorney, Agent, or Firm* — Baker & McKenzie LLP

(57) ABSTRACT

Present embodiments provide for a mobile device and an optical imaging lens thereof. The optical imaging lens comprises six lens elements positioned sequentially from an object side to an image side. Through controlling the convex or concave shape of the surfaces and/or the refracting power of the lens elements, the optical imaging lens shows better optical characteristics and the total length of the optical imaging lens is shortened.

18 Claims, 33 Drawing Sheets

| \multicolumn{7}{c}{f(Focus)=4.019 mm, HFOV(HFOV(Half angular field of view)= 37.067deg., System length=5.317mm, Fno= 2.0, Image Heigh=3.085mm} |||||||
|---|---|---|---|---|---|---|---|
| Surface # | | Radius | Thickness | Refractive index | Abbe number | Material | Focus |
| -- | Object | ∞ | ∞ | | | | |
| 111 | 1st lens element | 2.270 | 0.482 | 1.544 | 56.114 | plastic | 11.403 |
| 112 | | 3.304 | 0.145 | | | | |
| 100 | Aperture stop | ∞ | 0.043 | | | | |
| 121 | 2nd lens element | 2.518 | 0.566 | 1.544 | 56.114 | plastic | 3.952 |
| 122 | | -13.888 | 0.093 | | | | |
| 131 | 3rd lens element | -18.210 | 0.240 | 1.636 | 23.972 | plastic | -5.322 |
| 132 | | 4.213 | 0.572 | | | | |
| 141 | 4th lens element | -6.888 | 0.642 | 1.535 | 55.635 | plastic | 3.909 |
| 142 | | -1.659 | 0.126 | | | | |
| 151 | 5th lens element | -4.792 | 0.440 | 1.535 | 55.635 | plastic | 7.650 |
| 152 | | -2.281 | 0.153 | | | | |
| 161 | 6th lens element | -6.209 | 0.467 | 1.535 | 55.635 | plastic | -2.623 |
| 162 | | 1.866 | 0.500 | | | | |
| 171 | IR cut filter | ∞ | 0.300 | 1.517 | 64.167 | | |
| 172 | | ∞ | 0.549 | | | | |
| 180 | Image plane | ∞ | | | | | |

FIG. 4

| Aspherical parameters | | | | | | |
|---|---|---|---|---|---|---|
| Surface # | 111 | 112 | 121 | 122 | 131 | 132 |
| K | -1.97E+00 | -2.58E+01 | -6.58E+00 | -1.00E+02 | 0.00E+00 | 9.72E+00 |
| $a_4$ | | | -1.42E-02 | -9.16E-04 | 6.86E-02 | 5.97E-02 |
| $a_6$ | | | 1.52E-02 | 9.86E-03 | -7.13E-02 | -9.48E-02 |
| $a_8$ | | | 8.43E-03 | -1.65E-02 | 1.51E-02 | 3.06E-02 |
| $a_{10}$ | | | -8.40E-03 | -9.86E-03 | 1.23E-04 | 3.28E-03 |
| $a_{12}$ | | | -5.46E-03 | 4.14E-04 | 1.56E-03 | -3.54E-03 |
| $a_{14}$ | | | | | | |
| $a_{16}$ | | | | | | |
| Surface # | 141 | 142 | 151 | 152 | 161 | 162 |
| K | 0.00E+00 | -4.22E+00 | 0.00E+00 | 0.00E+00 | 0.00E+00 | -8.45E+00 |
| $a_4$ | 1.38E-02 | -6.83E-02 | 1.50E-02 | 1.31E-01 | -4.27E-02 | -6.65E-02 |
| $a_6$ | -6.84E-02 | 7.56E-03 | 6.22E-03 | -3.31E-02 | 1.45E-02 | 2.20E-02 |
| $a_8$ | 4.70E-02 | 4.14E-03 | -2.26E-03 | 3.68E-03 | 2.43E-03 | -5.61E-03 |
| $a_{10}$ | -6.74E-03 | 2.17E-03 | -5.22E-03 | 1.42E-04 | -1.07E-03 | 6.49E-04 |
| $a_{12}$ | -3.75E-03 | 1.49E-03 | 3.17E-03 | 4.43E-05 | 7.93E-06 | 3.07E-06 |
| $a_{14}$ | 6.41E-04 | 1.09E-04 | -5.94E-04 | -3.21E-05 | 2.54E-05 | -5.64E-06 |
| $a_{16}$ | -5.09E-04 | -3.27E-04 | 3.19E-05 | 3.52E-06 | -2.14E-06 | 2.78E-07 |

FIG. 5

| f(Focus)=4.171 mm, HFOV(HFOV(Half angular field of view)= 36.822deg., System length=5.273mm, Fno= 2.0, Image Heigh=3.085mm |||||||
|---|---|---|---|---|---|---|---|
| Surface # | | Radius | Thickness | Refractive index | Abbe number | Material | Focus |
| - | Object | ∞ | ∞ | | | | |
| 211 | 1st lens element | 2.311 | 0.586 | 1.544 | 56.114 | plastic | 10.991 |
| 212 | | 3.421 | 0.133 | | | | |
| 200 | Aperture stop | ∞ | 0.022 | | | | |
| 221 | 2nd lens element | 2.467 | 0.530 | 1.544 | 56.114 | plastic | 3.852 |
| 222 | | -13.171 | 0.060 | | | | |
| 231 | 3rd lens element | -21.622 | 0.253 | 1.636 | 23.972 | plastic | -5.521 |
| 232 | | 4.244 | 0.644 | | | | |
| 241 | 4th lens element | -5.952 | 0.641 | 1.535 | 55.635 | plastic | 3.873 |
| 242 | | -1.598 | 0.156 | | | | |
| 251 | 5th lens element | -4.823 | 0.528 | 1.535 | 55.635 | plastic | 7.688 |
| 252 | | -2.308 | 0.229 | | | | |
| 261 | 6th lens element | -5.609 | 0.220 | 1.535 | 55.635 | plastic | -2.427 |
| 262 | | 1.718 | 0.500 | | | | |
| 271 | IR cut filter | ∞ | 0.300 | 1.517 | 64.167 | | |
| 272 | | ∞ | 0.472 | | | | |
| 280 | Image plane | ∞ | | | | | |

FIG. 8

| Aspherical parameters | | | | | | |
|---|---|---|---|---|---|---|
| Surface # | 211 | 212 | 221 | 222 | 231 | 232 |
| K | -1.52E+00 | -2.36E+01 | -6.68E+00 | -1.00E+02 | 0.00E+00 | 1.02E+01 |
| $a_4$ | | | -1.41E-02 | -5.24E-03 | 6.64E-02 | 6.01E-02 |
| $a_6$ | | | 1.42E-02 | -1.32E-02 | -7.64E-02 | -9.14E-02 |
| $a_8$ | | | 3.06E-03 | -2.61E-02 | 4.19E-03 | 3.38E-02 |
| $a_{10}$ | | | -1.21E-02 | -1.18E-02 | -2.14E-03 | 2.74E-03 |
| $a_{12}$ | | | -1.09E-02 | 3.29E-03 | 8.71E-03 | -4.90E-03 |
| $a_{14}$ | | | | | | |
| $a_{16}$ | | | | | | |
| Surface # | 241 | 242 | 251 | 252 | 261 | 262 |
| K | 0.00E+00 | -4.72E+00 | 0.00E+00 | 0.00E+00 | 0.00E+00 | -8.76E+00 |
| $a_4$ | 4.38E-03 | -7.24E-02 | 1.24E-02 | 1.31E-01 | -4.42E-02 | -6.85E-02 |
| $a_6$ | -6.66E-02 | 6.17E-03 | 6.00E-03 | -3.31E-02 | 1.44E-02 | 2.22E-02 |
| $a_8$ | 4.70E-02 | 3.76E-03 | -2.26E-03 | 3.54E-03 | 2.43E-03 | -5.60E-03 |
| $a_{10}$ | -7.12E-03 | 2.10E-03 | -5.22E-03 | 1.36E-04 | -1.07E-03 | 6.48E-04 |
| $a_{12}$ | -3.96E-03 | 1.49E-03 | 3.17E-03 | 4.37E-05 | 7.85E-06 | 2.94E-06 |
| $a_{14}$ | 6.51E-04 | 1.21E-04 | -5.94E-04 | -3.21E-05 | 2.53E-05 | -5.67E-06 |
| $a_{16}$ | -3.94E-04 | -3.13E-04 | 3.19E-05 | 3.52E-06 | -2.14E-06 | 2.74E-07 |

FIG. 9

| f(Focus)=4.104 mm, HFOV(HPOV(Half angular field of view)= 37.515deg.. System length=5.401mm, Fno= 1.8, Image Heigh=3.150mm ||||||||
|---|---|---|---|---|---|---|---|
| Surface # | | Radius | Thickness | Refractive index | Abbe number | Material | Focus |
| - | Object | ∞ | ∞ | | | | |
| 311 | 1st lens element | 2.280 | 0.511 | 1.544 | 56.114 | plastic | 12.634 |
| 312 | | 3.135 | 0.173 | | | | |
| 300 | Aperture stop | ∞ | 0.005 | | | | |
| 321 | 2nd lens element | 2.522 | 0.605 | 1.544 | 56.114 | plastic | 3.991 |
| 322 | | -14.659 | 0.038 | | | | |
| 331 | 3rd lens element | -22.369 | 0.238 | 1.636 | 23.972 | plastic | -6.021 |
| 332 | | 4.677 | 0.576 | | | | |
| 341 | 4th lens element | -6.067 | 0.779 | 1.535 | 55.635 | plastic | 3.923 |
| 342 | | -1.632 | 0.154 | | | | |
| 351 | 5th lens element | -5.232 | 0.421 | 1.535 | 55.635 | plastic | 9.868 |
| 352 | | -2.705 | 0.034 | | | | |
| 361 | 6th lens element | 16.476 | 0.485 | 1.535 | 55.635 | plastic | -3.031 |
| 362 | | 1.464 | 0.500 | | | | |
| 371 | IR cut filter | ∞ | 0.300 | 1.517 | 64.167 | | |
| 372 | | ∞ | 0.582 | | | | |
| 380 | Image plane | ∞ | | | | | |

FIG. 12

| Aspherical parameters | | | | | | |
|---|---|---|---|---|---|---|
| Surface # | 311 | 312 | 321 | 322 | 331 | 332 |
| K | -1.67E+00 | -2.36E+01 | -5.45E+00 | -4.12E+02 | 0.00E+00 | 1.04E+01 |
| $a_4$ | | | -1.99E-02 | 6.96E-04 | 5.40E-02 | 4.03E-02 |
| $a_6$ | | | 1.36E-02 | 5.10E-03 | -5.32E-02 | -7.38E-02 |
| $a_8$ | | | 9.84E-03 | -1.05E-02 | 8.63E-03 | 2.85E-02 |
| $a_{10}$ | | | -7.01E-03 | -7.69E-03 | -1.46E-04 | 1.15E-03 |
| $a_{12}$ | | | -2.70E-03 | 1.24E-03 | 1.59E-03 | -2.83E-03 |
| $a_{14}$ | | | | | | |
| $a_{16}$ | | | | | | |
| Surface # | 341 | 342 | 351 | 352 | 361 | 362 |
| K | 0.00E+00 | -3.11E+00 | 0.00E+00 | 0.00E+00 | 0.00E+00 | -6.28E+00 |
| $a_4$ | -1.97E-04 | -6.05E-02 | 1.44E-02 | 1.29E-01 | -6.79E-02 | -6.63E-02 |
| $a_6$ | -7.19E-02 | 1.14E-03 | 7.58E-03 | -3.62E-02 | 1.33E-02 | 2.02E-02 |
| $a_8$ | 3.32E-02 | -9.19E-05 | -9.18E-04 | 3.25E-03 | 2.23E-03 | -5.12E-03 |
| $a_{10}$ | -2.89E-03 | 6.76E-04 | -5.18E-03 | 1.47E-04 | -8.09E-04 | 6.47E-04 |
| $a_{12}$ | -5.24E-04 | 1.00E-03 | 2.20E-03 | 4.30E-05 | -6.79E-06 | -5.22E-06 |
| $a_{14}$ | 7.73E-04 | 2.64E-04 | -3.14E-04 | -2.39E-05 | 2.01E-05 | -5.61E-06 |
| $a_{16}$ | -9.53E-04 | -1.08E-04 | 1.50E-05 | 2.19E-06 | -1.69E-06 | 3.00E-07 |

FIG. 13

| f(Focus)=4.420 mm, HFOV(HFOV(Half angular field of view)= 35.485deg., System length=5.405mm, Fno= 1.8, Image Heigh=3.150mm ||||||||
|---|---|---|---|---|---|---|---|
| Surface # | | Radius | Thickness | Refractive index | Abbe number | Material | Focus |
| - | Object | ∞ | ∞ | | | | |
| 411 | 1st lens element | 2.183 | 0.726 | 1.544 | 56.114 | plastic | 9.365 |
| 412 | | 3.361 | 0.141 | | | | |
| 400 | Aperture stop | ∞ | -0.068 | | | | |
| 421 | 2nd lens element | 2.739 | 0.533 | 1.544 | 56.114 | plastic | 4.571 |
| 422 | | -26.090 | 0.050 | | | | |
| 431 | 3rd lens element | -24.656 | 0.222 | 1.636 | 23.972 | plastic | -6.245 |
| 432 | | 4.789 | 0.729 | | | | |
| 441 | 4th lens element | -261.439 | 0.941 | 1.535 | 55.635 | plastic | 3.025 |
| 442 | | -1.614 | 0.076 | | | | |
| 451 | 5th lens element | -2.606 | 0.229 | 1.535 | 55.635 | plastic | 348.764 |
| 452 | | -2.649 | 0.084 | | | | |
| 461 | 6th lens element | -47.918 | 0.422 | 1.535 | 55.635 | plastic | -2.915 |
| 462 | | 1.621 | 0.500 | | | | |
| 471 | IR cut filter | ∞ | 0.300 | 1.517 | 64.167 | | |
| 472 | | ∞ | 0.518 | | | | |
| 480 | Image plane | ∞ | | | | | |

FIG. 16

| Aspherical parameters | | | | | | |
|---|---|---|---|---|---|---|
| Surface # | 411 | 412 | 421 | 422 | 431 | 432 |
| K | -8.44E-01 | -4.56E+01 | -1.29E+01 | 2.55E+01 | 0.00E+00 | 1.10E+01 |
| $a_4$ | | | -2.55E-02 | -6.64E-03 | 5.29E-02 | 5.10E-02 |
| $a_6$ | | | 1.43E-02 | -2.98E-03 | -5.45E-02 | -7.26E-02 |
| $a_8$ | | | 9.77E-03 | -1.22E-02 | 6.07E-03 | 3.10E-02 |
| $a_{10}$ | | | -8.07E-03 | -7.45E-03 | -1.31E-03 | 1.34E-03 |
| $a_{12}$ | | | -3.63E-03 | 1.24E-03 | 1.76E-03 | -3.19E-03 |
| $a_{14}$ | | | | | | |
| $a_{16}$ | | | | | | |
| Surface # | 441 | 442 | 451 | 452 | 461 | 462 |
| K | 0.00E+00 | -3.36E+00 | 0.00E+00 | 0.00E+00 | 0.00E+00 | -8.28E+00 |
| $a_4$ | 1.36E-02 | -6.05E-02 | -6.87E-03 | 1.12E-01 | -7.58E-02 | -6.90E-02 |
| $a_6$ | -6.52E-02 | 2.82E-03 | 8.04E-03 | -3.69E-02 | 1.39E-02 | 1.94E-02 |
| $a_8$ | 2.82E-02 | 2.67E-04 | -5.78E-04 | 3.33E-03 | 2.45E-03 | -5.10E-03 |
| $a_{10}$ | -5.14E-03 | 5.12E-05 | -5.05E-03 | 1.22E-04 | -7.76E-04 | 6.79E-04 |
| $a_{12}$ | -2.26E-04 | 7.05E-04 | 2.21E-03 | 3.51E-05 | -4.65E-06 | -1.67E-06 |
| $a_{14}$ | 1.34E-03 | 1.92E-04 | -3.25E-04 | -2.37E-05 | 1.96E-05 | -5.70E-06 |
| $a_{16}$ | -7.95E-04 | -1.18E-04 | 8.51E-06 | 2.93E-06 | -1.87E-06 | 2.09E-07 |

FIG. 17

| \multicolumn{7}{c}{f(Focus)=4.315 mm, HFOV(HFOV(Half angular field of view)= 36.138deg., System length=5.401mm, Fno=1.8, Image Heigh=3.150mm} |||||||
|---|---|---|---|---|---|---|---|
| Surface # | | Radius | Thickness | Refractive index | Abbe number | Material | Focus |
| - | Object | ∞ | ∞ | | | | |
| 511 | 1st lens element | 2.202 | 0.508 | 1.544 | 56.114 | plastic | 13.745 |
| 512 | | 2.864 | 0.191 | | | | |
| 500 | Aperture stop | ∞ | 0.000 | | | | |
| 521 | 2nd lens element | 2.798 | 0.587 | 1.544 | 56.114 | plastic | 4.245 |
| 522 | | -12.491 | 0.131 | | | | |
| 531 | 3rd lens element | -25.254 | 0.233 | 1.636 | 23.972 | plastic | -6.315 |
| 532 | | 4.831 | 0.580 | | | | |
| 541 | 4th lens element | -6.701 | 0.524 | 1.535 | 55.635 | plastic | 5.353 |
| 542 | | -2.065 | 0.088 | | | | |
| 551 | 5th lens element | -5.191 | 0.432 | 1.535 | 55.635 | plastic | 9.759 |
| 552 | | -2.682 | 0.365 | | | | |
| 561 | 6th lens element | 84.226 | 0.440 | 1.535 | 55.635 | plastic | -3.657 |
| 562 | | 1.913 | 0.500 | | | | |
| 571 | IR cut filter | ∞ | 0.300 | 1.517 | 64.167 | | |
| 572 | | ∞ | 0.521 | | | | |
| 580 | Image plane | ∞ | | | | | |

FIG. 20

| Aspherical parameters | | | | | | |
|---|---|---|---|---|---|---|
| Surface # | 511 | 512 | 521 | 522 | 531 | 532 |
| K | -1.98E+00 | -1.96E-01 | -6.33E+00 | -2.36E+02 | 0.00E+00 | 1.00E+01 |
| $a_4$ | | | -2.02E-02 | 2.19E-03 | 5.03E-02 | 3.50E-02 |
| $a_6$ | | | 1.36E-02 | 7.91E-03 | -5.49E-02 | -7.83E-02 |
| $a_8$ | | | 9.31E-03 | -8.93E-03 | 8.61E-03 | 2.70E-02 |
| $a_{10}$ | | | -7.08E-03 | -7.23E-03 | 1.93E-04 | 8.68E-04 |
| $a_{12}$ | | | -2.20E-03 | 1.18E-03 | 1.94E-03 | -2.70E-03 |
| $a_{14}$ | | | | | | |
| $a_{16}$ | | | | | | |
| Surface # | 541 | 542 | 551 | 552 | 561 | 562 |
| K | 0.00E+00 | -1.98E+00 | 0.00E+00 | 0.00E+00 | 0.00E+00 | -6.88E+00 |
| $a_4$ | -2.30E-02 | -6.27E-02 | 3.74E-02 | 1.22E-01 | -7.20E-02 | -6.89E-02 |
| $a_6$ | -6.82E-02 | 3.17E-03 | 3.26E-03 | -3.35E-02 | 1.28E-02 | 2.10E-02 |
| $a_8$ | 3.27E-02 | 6.90E-04 | -1.31E-03 | 2.76E-03 | 2.64E-03 | -5.10E-03 |
| $a_{10}$ | -2.53E-03 | 9.36E-04 | -5.21E-03 | 1.11E-04 | -7.75E-04 | 6.34E-04 |
| $a_{12}$ | -1.31E-04 | 1.10E-03 | 2.19E-03 | 5.97E-05 | -1.65E-05 | -6.30E-06 |
| $a_{14}$ | 6.34E-04 | 3.01E-04 | -3.11E-04 | -2.08E-05 | 1.81E-05 | -5.49E-06 |
| $a_{16}$ | -1.42E-03 | -9.24E-05 | 1.89E-05 | 1.74E-06 | -1.38E-06 | 3.10E-07 |

FIG. 21

| f(Focus)=4.061 mm, HFOV(HFOV(Half angular field of view)= 37.385deg., System length=5.302mm, Fno= 2.0, Image Heigh=3.085mm |||||||
|---|---|---|---|---|---|---|
| Surface # | | Radius | Thickness | Refractive index | Abbe number | Material | Focus |
| - | Object | ∞ | ∞ | | | | |
| 611 | 1st lens element | 2.547 | 0.406 | 1.544 | 56.114 | plastic | 92.154 |
| 612 | | 2.532 | 0.182 | | | | |
| 600 | Aperture stop | ∞ | -0.094 | | | | |
| 621 | 2nd lens element | 1.823 | 0.744 | 1.544 | 56.114 | plastic | 3.167 |
| 622 | | -28.649 | 0.095 | | | | |
| 631 | 3rd lens element | -23.327 | 0.240 | 1.636 | 23.972 | plastic | -6.214 |
| 632 | | 4.816 | 0.497 | | | | |
| 641 | 4th lens element | -6.113 | 0.810 | 1.535 | 55.635 | plastic | 3.562 |
| 642 | | -1.523 | 0.098 | | | | |
| 651 | 5th lens element | -4.945 | 0.481 | 1.535 | 55.635 | plastic | 7.509 |
| 652 | | -2.295 | 0.147 | | | | |
| 661 | 6th lens element | -7.033 | 0.364 | 1.535 | 55.635 | plastic | -2.380 |
| 662 | | 1.588 | 0.500 | | | | |
| 671 | IR cut filter | ∞ | 0.300 | 1.517 | 64.167 | | |
| 672 | | ∞ | 0.533 | | | | |
| 680 | Image plane | ∞ | | | | | |

FIG. 24

| Aspherical parameters | | | | | | |
|---|---|---|---|---|---|---|
| Surface # | 611 | 612 | 621 | 622 | 631 | 632 |
| K | -2.58E-00 | -1.24E-01 | -3.59E+00 | 3.62E+02 | 0.00E+00 | 1.22E+01 |
| $a_4$ | | | -2.46E-03 | -1.04E-02 | 5.82E-02 | 8.36E-02 |
| $a_6$ | | | 1.55E-02 | -2.81E-03 | -7.12E-02 | -8.46E-02 |
| $a_8$ | | | 4.11E-03 | -1.68E-02 | 1.51E-02 | 3.32E-02 |
| $a_{10}$ | | | -9.95E-03 | -8.07E-03 | 1.02E-03 | 3.68E-03 |
| $a_{12}$ | | | -3.67E-03 | 2.86E-03 | 2.31E-03 | -3.54E-03 |
| $a_{14}$ | | | | | | |
| $a_{16}$ | | | | | | |
| Surface # | 641 | 642 | 651 | 652 | 661 | 662 |
| K | 0.00E-00 | -3.74E-00 | 0.00E+00 | 0.00E+00 | 0.00E+00 | -7.70E+00 |
| $a_4$ | 1.71E-02 | -5.87E-02 | 6.50E-03 | 1.20E-01 | -5.65E-02 | -7.19E-02 |
| $a_6$ | -6.70E-02 | 2.53E-03 | 4.84E-03 | -3.28E-02 | 1.51E-02 | 2.25E-02 |
| $a_8$ | 5.04E-02 | 2.25E-03 | -2.33E-03 | 3.76E-03 | 2.57E-03 | -5.56E-03 |
| $a_{10}$ | -6.83E-03 | 2.32E-03 | -5.19E-03 | 1.36E-04 | -1.06E-03 | 6.38E-04 |
| $a_{12}$ | -3.55E-03 | 1.70E-03 | 3.19E-03 | 4.06E-05 | 6.72E-06 | 1.80E-06 |
| $a_{14}$ | 9.13E-04 | 1.71E-04 | -5.88E-04 | -3.23E-05 | 2.50E-05 | -5.62E-06 |
| $a_{16}$ | -3.94E-04 | -3.21E-04 | 3.14E-05 | 3.73E-06 | -2.14E-06 | 2.94E-07 |

FIG. 25

| f(Focus)=4.145 mm, HFOV(HFOV(Half angular field of view)= 37.241deg., System length=5.401mm, Fno= 1.8, Image Heigh=3.150mm | | | | | | | |
|---|---|---|---|---|---|---|---|
| Surface # | | Radius | Thickness | Refractive index | Abbe number | Material | Focus |
| - | Object | ∞ | ∞ | | | | |
| 711 | 1st lens element | 2.249 | 0.518 | 1.544 | 56.114 | plastic | 12.376 |
| 712 | | 3.098 | 0.172 | | | | |
| 700 | Aperture stop | ∞ | -0.023 | | | | |
| 721 | 2nd lens element | 2.733 | 0.741 | 1.544 | 56.114 | plastic | 4.410 |
| 722 | | -18.272 | 0.096 | | | | |
| 731 | 3rd lens element | -25.757 | 0.245 | 1.636 | 23.972 | plastic | -5.996 |
| 732 | | 4.528 | 0.444 | | | | |
| 741 | 4th lens element | -13.945 | 0.775 | 1.535 | 55.635 | plastic | 3.853 |
| 742 | | -1.835 | 0.096 | | | | |
| 751 | 5th lens element | -5.936 | 0.443 | 1.535 | 55.635 | plastic | 8.792 |
| 752 | | -2.696 | 0.129 | | | | |
| 761 | 6th lens element | 41.351 | 0.405 | 1.535 | 55.635 | plastic | -2.943 |
| 762 | | 1.515 | 0.500 | | | | |
| 771 | IR cut filter | ∞ | 0.300 | 1.517 | 64.167 | | |
| 772 | | ∞ | 0.561 | | | | |
| 780 | Image plane | ∞ | | | | | |

FIG. 28

| Aspherical parameters | | | | | | |
|---|---|---|---|---|---|---|
| Surface # | 711 | 712 | 721 | 722 | 731 | 732 |
| K | -1.71E+00 | -2.31E-01 | -5.35E+00 | -7.85E+02 | 0.00E-00 | 1.01E+01 |
| $a_4$ | | | -2.01E-02 | 3.06E-03 | 4.99E-02 | 5.29E-02 |
| $a_6$ | | | 1.23E-02 | 2.80E-03 | -5.56E-02 | -7.86E-02 |
| $a_8$ | | | 8.63E-03 | -1.18E-02 | 7.91E-03 | 2.71E-02 |
| $a_{10}$ | | | -6.86E-03 | -7.36E-03 | -5.33E-04 | 1.39E-03 |
| $a_{12}$ | | | -1.32E-03 | 2.01E-03 | 1.51E-03 | -2.22E-03 |
| $a_{14}$ | | | | | | |
| $a_{16}$ | | | | | | |
| Surface # | 741 | 742 | 751 | 752 | 761 | 762 |
| K | 0.00E+00 | -3.78E-00 | 0.00E+00 | 0.00E+00 | 0.00E-00 | -6.66E+00 |
| $a_4$ | 2.90E-02 | -5.44E-02 | 2.86E-03 | 1.32E-01 | -6.28E-02 | -6.62E-02 |
| $a_6$ | -6.42E-02 | 2.63E-03 | 5.54E-03 | -3.70E-02 | 1.25E-02 | 1.99E-02 |
| $a_8$ | 3.45E-02 | 1.03E-03 | -2.92E-04 | 3.40E-03 | 2.19E-03 | -5.30E-03 |
| $a_{10}$ | -4.80E-03 | 1.30E-03 | -4.93E-03 | 1.40E-04 | -8.01E-04 | 6.53E-04 |
| $a_{12}$ | -1.08E-03 | 1.11E-03 | 2.24E-03 | 3.43E-05 | -3.94E-06 | 5.35E-07 |
| $a_{14}$ | 1.05E-03 | 1.90E-04 | -3.16E-04 | -2.52E-05 | 2.04E-05 | -5.02E-06 |
| $a_{16}$ | -6.30E-04 | -1.99E-04 | 1.09E-05 | 2.48E-06 | -1.70E-06 | 2.02E-07 |

FIG. 29

| \multicolumn{8}{|c|}{f(Focus)=4.206 mm, HFOV(HFOV(Half angular field of view)= 36.840deg., System length=5.401mm, Fno= 1.8, Image Heigh=3.150mm} |
|---|---|---|---|---|---|---|---|
| Surface # | | Radius | Thickness | Refractive index | Abbe number | Material | Focus |
| - | Object | ∞ | ∞ | | | | |
| 811 | 1st lens element | 2.190 | 0.508 | 1.544 | 56.114 | plastic | 12.793 |
| 812 | | 2.929 | 0.179 | | | | |
| 800 | Aperture stop | ∞ | -0.004 | | | | |
| 821 | 2nd lens element | 2.955 | 0.558 | 1.544 | 56.114 | plastic | 4.248 |
| 822 | | -10.060 | 0.092 | | | | |
| 831 | 3rd lens element | -22.729 | 0.397 | 1.636 | 23.972 | plastic | -6.220 |
| 832 | | 4.861 | 0.563 | | | | |
| 841 | 4th lens element | -6.706 | 0.624 | 1.535 | 55.635 | plastic | 4.138 |
| 842 | | -1.722 | 0.096 | | | | |
| 851 | 5th lens element | -5.956 | 0.426 | 1.535 | 55.635 | plastic | 9.448 |
| 852 | | -2.806 | 0.150 | | | | |
| 861 | 6th lens element | 41.083 | 0.452 | 1.535 | 55.635 | plastic | -3.032 |
| 862 | | 1.558 | 0.500 | | | | |
| 871 | IR cut filter | ∞ | 0.300 | 1.517 | 64.167 | | |
| 872 | | ∞ | 0.560 | | | | |
| 880 | Image plane | ∞ | | | | | |

FIG. 32

| Aspherical parameters | | | | | | |
|---|---|---|---|---|---|---|
| Surface # | 811 | 812 | 821 | 822 | 831 | 832 |
| K | -1.96E+00 | -2.27E+01 | -7.02E+00 | -3.75E+02 | 0.00E+00 | 1.02E+01 |
| $a_4$ | | | -2.19E-02 | -4.50E-04 | 5.39E-02 | 3.69E-02 |
| $a_6$ | | | 1.34E-02 | 5.33E-03 | -5.45E-02 | -7.38E-02 |
| $a_8$ | | | 9.69E-03 | -1.00E-02 | 8.21E-03 | 2.80E-02 |
| $a_{10}$ | | | -7.21E-03 | -7.50E-03 | -1.96E-04 | 8.34E-04 |
| $a_{12}$ | | | -2.81E-03 | 1.21E-03 | 1.68E-03 | -2.89E-03 |
| $a_{14}$ | | | | | | |
| $a_{16}$ | | | | | | |
| Surface # | 841 | 842 | 851 | 852 | 861 | 862 |
| K | 0.00E+00 | -3.24E+00 | 0.00E+00 | 0.00E+00 | 0.00E+00 | -6.82E+00 |
| $a_4$ | 5.59E-03 | -6.05E-02 | 2.04E-02 | 1.28E-01 | -6.76E-02 | -6.64E-02 |
| $a_6$ | -7.64E-02 | 6.10E-04 | 7.41E-03 | -3.66E-02 | 1.37E-02 | 2.02E-02 |
| $a_8$ | 3.18E-02 | -2.79E-04 | -1.13E-03 | 3.19E-03 | 2.27E-03 | -5.11E-03 |
| $a_{10}$ | -2.77E-03 | 7.29E-04 | -5.23E-03 | 1.48E-04 | -8.04E-04 | 6.50E-04 |
| $a_{12}$ | -3.49E-04 | 1.06E-03 | 2.20E-03 | 4.48E-05 | -8.13E-06 | -5.26E-06 |
| $a_{14}$ | 7.63E-04 | 2.94E-04 | -3.13E-04 | -2.37E-05 | 1.98E-05 | -5.65E-06 |
| $a_{16}$ | -1.06E-03 | -9.53E-05 | 1.58E-05 | 2.16E-06 | -1.66E-06 | 3.01E-07 |

FIG. 33

| f(Focus)=4.169 mm, HFOV(HFOV(Half angular field of view)= 37.083deg., System length=5.402mm, Fno= 1.8, Image Heigh=3.150mm ||||||||
|---|---|---|---|---|---|---|---|
| Surface # | | Radius | Thickness | Refractive index | Abbe number | Material | Focus |
| - | Object | ∞ | ∞ | | | | |
| 911 | 1st lens element | 2.233 | 0.488 | 1.544 | 56.114 | plastic | 13.104 |
| 912 | | 2.996 | 0.175 | | | | |
| 900 | Aperture stop | ∞ | 0.011 | | | | |
| 921 | 2nd lens element | 2.738 | 0.594 | 1.544 | 56.114 | plastic | 4.148 |
| 922 | | -12.091 | 0.094 | | | | |
| 931 | 3rd lens element | -22.668 | 0.234 | 1.636 | 23.972 | plastic | -6.176 |
| 932 | | 4.809 | 0.588 | | | | |
| 941 | 4th lens element | -6.839 | 0.593 | 1.535 | 55.635 | plastic | 4.466 |
| 942 | | -1.827 | 0.094 | | | | |
| 951 | 5th lens element | -6.037 | 0.598 | 1.535 | 55.635 | plastic | 8.606 |
| 952 | | -2.706 | 0.122 | | | | |
| 961 | 6th lens element | 19.144 | 0.445 | 1.535 | 55.635 | plastic | -3.203 |
| 962 | | 1.564 | 0.500 | | | | |
| 971 | IR cut filter | ∞ | 0.300 | 1.517 | 64.167 | | |
| 972 | | ∞ | 0.566 | | | | |
| 980 | Image plane | ∞ | | | | | |

FIG. 36

| Aspherical parameters | | | | | | |
|---|---|---|---|---|---|---|
| Surface # | 911 | 912 | 921 | 922 | 931 | 932 |
| K | -2.03E+00 | -2.18E+01 | -5.70E+00 | -3.20E+02 | 0.00E+00 | 1.00E+01 |
| $a_4$ | | | -2.04E-02 | 1.44E-03 | 5.34E-02 | 3.68E-02 |
| $a_6$ | | | 1.31E-02 | 6.24E-03 | -5.38E-02 | -7.52E-02 |
| $a_8$ | | | 9.48E-03 | -9.93E-03 | 8.56E-03 | 2.79E-02 |
| $a_{10}$ | | | -7.10E-03 | -7.54E-03 | -6.27E-05 | 9.72E-04 |
| $a_{12}$ | | | -2.56E-03 | 1.22E-03 | 1.69E-03 | -2.81E-03 |
| $a_{14}$ | | | | | | |
| $a_{16}$ | | | | | | |
| Surface # | 941 | 942 | 951 | 952 | 961 | 962 |
| K | 0.00E+00 | -3.18E+00 | 0.00E+00 | 0.00E+00 | 0.00E+00 | -6.44E+00 |
| $a_4$ | -9.04E-03 | -6.15E-02 | 2.18E-02 | 1.28E-01 | -6.79E-02 | -6.66E-02 |
| $a_6$ | -7.33E-02 | 2.72E-04 | 6.53E-03 | -3.53E-02 | 1.28E-02 | 2.02E-02 |
| $a_8$ | 3.36E-02 | -2.85E-04 | -1.21E-03 | 3.29E-03 | 2.20E-03 | -5.12E-03 |
| $a_{10}$ | -2.68E-03 | 7.86E-04 | -5.20E-03 | 1.14E-04 | -7.87E-04 | 6.54E-04 |
| $a_{12}$ | -6.08E-04 | 1.11E-03 | 2.21E-03 | 3.66E-05 | -2.74E-06 | -4.08E-06 |
| $a_{14}$ | 6.20E-04 | 3.20E-04 | -3.12E-04 | -2.41E-05 | 1.98E-05 | -5.66E-06 |
| $a_{16}$ | -1.07E-03 | -8.11E-05 | 1.59E-05 | 2.42E-06 | -1.94E-06 | 2.55E-07 |

FIG. 37

| \multicolumn{7}{c}{f(Focus)=4.683 mm, HFOV(HFOV(Half angular field of view)= 33.934deg., System length=5.405mm, Fno= 1.8, Image Heigh=3.150mm} |||||||
|---|---|---|---|---|---|---|---|
| Surface # | | Radius | Thickness | Refractive index | Abbe number | Material | Focus |
| - | Object | ∞ | ∞ | | | | |
| 1011 | 1st lens element | 1.879 | 0.684 | 1.544 | 56.114 | plastic | 6.805 |
| 1012 | | 3.312 | 0.115 | | | | |
| 1000 | Aperture stop | ∞ | -0.002 | | | | |
| 1021 | 2nd lens element | 3.199 | 0.516 | 1.544 | 56.114 | plastic | 5.342 |
| 1022 | | -31.186 | 0.088 | | | | |
| 1031 | 3rd lens element | -25.901 | 0.235 | 1.636 | 23.972 | plastic | -6.436 |
| 1032 | | 4.918 | 0.456 | | | | |
| 1041 | 4th lens element | -5.626 | 1.158 | 1.535 | 55.635 | plastic | 2.317 |
| 1042 | | -1.091 | 0.077 | | | | |
| 1051 | 5th lens element | -2.224 | 0.258 | 1.535 | 55.635 | plastic | 66.012 |
| 1052 | | -2.177 | 0.089 | | | | |
| 1061 | 6th lens element | -5.468 | 0.404 | 1.535 | 55.635 | plastic | -1.898 |
| 1062 | | 1.283 | 0.500 | | | | |
| 1071 | IR cut filter | ∞ | 0.300 | 1.517 | 64.167 | | |
| 1072 | | ∞ | 0.526 | | | | |
| 1080 | Image plane | ∞ | | | | | |

FIG. 40

| Aspherical parameters | | | | | | |
|---|---|---|---|---|---|---|
| Surface # | 1011 | 1012 | 1021 | 1022 | 1031 | 1032 |
| K | -3.91E-01 | -3.39E-01 | -1.22E+01 | -2.74E+03 | 0.00E+00 | 1.29E+01 |
| $a_4$ | | | -3.09E-02 | 2.27E-03 | 5.51E-02 | 4.93E-02 |
| $a_6$ | | | 1.24E-02 | -4.02E-03 | -5.87E-02 | -6.02E-02 |
| $a_8$ | | | 1.03E-02 | -1.34E-02 | 4.27E-03 | 3.36E-02 |
| $a_{10}$ | | | -6.68E-03 | -7.46E-03 | -2.44E-03 | 8.96E-04 |
| $a_{12}$ | | | -2.26E-03 | 1.74E-03 | 7.80E-04 | -3.96E-03 |
| $a_{14}$ | | | | | | |
| $a_{16}$ | | | | | | |
| Surface # | 1041 | 1042 | 1051 | 1052 | 1061 | 1062 |
| K | 0.00E+00 | -3.42E-00 | 0.00E+00 | 0.00E+00 | 0.00E+00 | -9.55E+00 |
| $a_4$ | -3.96E-03 | -5.32E-02 | 4.35E-02 | 1.16E-01 | -5.96E-02 | -7.11E-02 |
| $a_6$ | -3.16E-02 | 1.19E-02 | 3.66E-03 | -3.73E-02 | 1.56E-02 | 2.04E-02 |
| $a_8$ | 3.62E-02 | 1.84E-03 | -5.93E-03 | 3.64E-03 | 1.98E-03 | -4.94E-03 |
| $a_{10}$ | -4.90E-03 | 2.79E-04 | -4.84E-03 | 2.00E-04 | -8.72E-04 | 6.25E-04 |
| $a_{12}$ | -1.21E-03 | 6.92E-04 | 2.53E-03 | 5.39E-05 | -1.54E-05 | -1.07E-05 |
| $a_{14}$ | 7.04E-04 | 1.32E-04 | -2.87E-04 | -1.95E-05 | 2.02E-05 | -5.82E-06 |
| $a_{16}$ | -8.36E-04 | -1.67E-04 | -2.06E-05 | 3.63E-06 | -1.04E-06 | 3.38E-07 |

FIG. 41

| Embodiment | 1st Embodiment | 2nd Embodiment | 3th Embodiment | 4th Embodiment | 5th Embodiment |
|---|---|---|---|---|---|
| (CT4+AC34)/CT3 | 4.99 | 5.08 | 5.70 | 7.52 | 4.73 |
| AC34/(AC45--AC56) | 2.00 | 1.67 | 3.06 | 4.56 | 1.28 |
| (CT1+AC34) / CT6 | 2.35 | 5.59 | 2.24 | 3.45 | 2.47 |
| AC34/CT3 | 2.36 | 2.55 | 2.42 | 3.28 | 2.48 |
| (CT2+CT4 )/CT6 | 2.70 | 5.32 | 2.85 | 3.49 | 2.53 |
| AC34/AC23 | 5.78 | 10.74 | 15.36 | 14.58 | 4.41 |
| (CT1+CT2) /CT6 | 2.39 | 5.07 | 2.30 | 2.98 | 2.49 |
| AC34/CT6 | 1.26 | 2.93 | 1.19 | 1.73 | 1.32 |
| (CT1+AC34) /CT3 | 4.40 | 4.86 | 4.58 | 3.45 | 4.66 |
| AC12/AC45 | 1.59 | 0.99 | 1.15 | 0.96 | 2.16 |
| (CT2+CT4)/CT5 | 2.75 | 2.22 | 3.29 | 6.44 | 2.57 |
| (CT1+AC34) /CT5 | 2.40 | 2.33 | 2.58 | 6.35 | 2.52 |
| AC34/ ( AC23+AC56) | 2.22 | 2.23 | 8.06 | 5.44 | 1.17 |
| AC34/CT5 | 1.28 | 1.22 | 1.37 | 3.18 | 1.34 |
| CT4 / (AC23+AC56) | 2.48 | 2.22 | 10.89 | 7.02 | 1.06 |
| (CT2+AC34)/CT3 | 4.78 | 4.64 | 4.97 | 5.68 | 5.00 |
| (CT1+CT4)/CT5 | 2.55 | 2.32 | 3.06 | 7.28 | 2.39 |

| Embodiment | 6th Embodiment | 7th Embodiment | 8th Embodiment | 9th Embodiment | 10th Embodiment |
|---|---|---|---|---|---|
| (CT4+AC34)/CT3 | 5.45 | 4.97 | 2.99 | 5.05 | 6.86 |
| AC34/(AC45--AC56) | 2.03 | 1.97 | 2.29 | 2.72 | 2.14 |
| (CT1+AC34) / CT6 | 2.48 | 2.37 | 2.37 | 2.42 | 2.61 |
| AC34/CT3 | 2.07 | 1.81 | 1.42 | 2.51 | 1.66 |
| (CT2+CT4 )/CT6 | 4.27 | 3.74 | 2.62 | 2.67 | 3.83 |
| AC34/AC23 | 5.26 | 4.64 | 6.12 | 6.26 | 3.96 |
| (CT1+CT2) /CT6 | 3.16 | 3.10 | 2.36 | 2.43 | 2.93 |
| AC34/CT6 | 1.36 | 1.09 | 1.25 | 1.32 | 0.85 |
| (CT1+AC34) /CT3 | 3.76 | 3.92 | 2.70 | 4.60 | 5.11 |
| AC12/AC45 | 0.90 | 1.55 | 1.82 | 1.98 | 1.07 |
| (CT2+CT4)/CT5 | 3.23 | 3.42 | 2.77 | 1.98 | 6.14 |
| (CT1+AC34) /CT5 | 1.88 | 2.17 | 2.51 | 1.80 | 4.19 |
| AC34/ ( AC23+AC56) | 2.06 | 1.97 | 2.33 | 2.72 | 2.01 |
| AC34/CT5 | 1.03 | 1.00 | 1.32 | 0.98 | 1.36 |
| CT4 / (AC23+AC56) | 3.36 | 3.45 | 2.58 | 2.75 | 6.32 |
| (CT2+AC34)/CT3 | 5.17 | 4.83 | 2.82 | 5.05 | 3.95 |
| (CT1+CT4)/CT5 | 2.53 | 2.92 | 2.66 | 1.81 | 7.10 |

FIG. 42

MOBILE DEVICE AND OPTICAL IMAGING LENS THEREOF

INCORPORATION BY REFERENCE

This application claims priority from P.R.C. Patent Application No. 201310402978.6, filed on Sep. 6, 2013, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having six lens elements and an optical imaging lens thereof.

BACKGROUND

The ever-increasing demand for smaller sized mobile devices, such as cell phones, digital cameras, etc. correspondingly triggered a growing need for a smaller sized photography module, comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

The length of conventional optical imaging lenses comprising four lens elements can be limited in a certain range; however, as the more and more demands in the market for high-end products, high-standard optical imaging lenses which show great quality with more pixels with six lens elements are required. U.S. Pat. No. 8,345,354 and R.O.C. Patent Publication No. 201250283 both disclosed an optical imaging lens constructed with an optical imaging lens having six lens elements, wherein the length of the optical imaging lens, which, from the object-side surface of the first lens element to the image plane, are too long for smaller sized mobile devices. Therefore, there is needed to develop optical imaging lens which is capable to place with six lens elements therein, with a shorter length, while also having good optical characters.

SUMMARY

An object of the present invention is to provide a mobile device and an optical imaging lens thereof. With controlling the convex or concave shape of the surfaces and/or the refracting power of the lens elements, the length of the optical imaging lens is shortened and meanwhile the good optical characters, and system functionality are sustained.

In an exemplary embodiment, an optical imaging lens comprises, sequencially from an object side to an image side along an optical axis, comprises a first lens element, an aperture stop, and second, third, fourth and fifth lens elements, each of the first, second, third, fourth, fifth and sixth lens elements having refracting power, an object-side surface facing toward the object side and an image-side surface facing toward the image side, wherein: the object-side surface of the first lens element comprises a convex portion in a vicinity of the optical axis; the image-side surface of the second lens element comprises a convex portion in a vicinity of a periphery of the second lens element; the third lens element has negative refracting power; the image-side surface of the fourth lens element comprises a convex portion in a vicinity of a periphery of the fourth lens element; and the image-side surface of the sixth lens element comprises a concave portion in a vicinity of the optical axis and a convex portion in a vicinity of a periphery of the sixth lens element; the optical imaging lens as a whole comprises only the six lens elements having refracting power.

In another exemplary embodiment, other equation (s), such as those relating to the ratio among parameters could be taken into consideration. For example, a central thickness of the third lens element along the optical axis, CT3, a central thickness of the fourth lens element along the optical axis, CT4, and an air gap between the third lens element and the fourth lens element along the optical axis, AC34, could be controlled to satisfy the equation as follows:

$$2.20 \leq (CT4+AC34)/CT3 \qquad \text{Equation (1); or}$$

AC34, an air gap between the fourth lens element and the fifth lens element along the optical axis, AC45, and an air gap between the fifth lens element and the sixth lens element along the optical axis, AC56, could be controlled to satisfy the equation as follows:

$$1.00 \leq AC34/(AC45+AC56) \qquad \text{Equation (2); or}$$

AC34, a central thickness of the first lens element along the optical axis, CT1, and a central thickness of the sixth lens element along the optical axis, CT6, could be controlled to satisfy the equation as follows:

$$2.00 \leq (CT1+AC34)/CT6 \qquad \text{Equation (3); or}$$

AC34 and CT3 could be controlled to satisfy the equation as follows:

$$1.60 \leq AC34/CT3 \qquad \text{Equation (4); or}$$

CT4, CT6 and a central thickness of the second lens element along the optical axis, CT2, could be controlled to satisfy the equation as follows:

$$2.48 \leq (CT2+CT4)/CT6 \qquad \text{Equation (5); or}$$

AC34 and an air gap between the second lens element and the third lens element along the optical axis, AC23, could be controlled to satisfy the equation as follows:

$$3.30 \leq AC34/AC23 \qquad \text{Equation (6); or}$$

CT1, CT2 and CT6 could be controlled to satisfy the equation as follows:

$$2.00 \leq (CT1+CT2)/CT6 \qquad \text{Equation (7); or}$$

CT6 and AC34 could be controlled to satisfy the equation as follows:

$$1.00 \leq AC34/CT6 \qquad \text{Equation (8); or}$$

CT1, CT3 and AC34 could be controlled to satisfy the equation as follows:

$$2.20 \leq (CT1+AC34)/CT3 \qquad \text{Equation (9); or}$$

AC45 and an air gap between the first lens element and the second lens element along the optical axis, AC12, could be controlled to satisfy the equation as follows:

$$0.90 \leq AC12/AC45 \qquad \text{Equation (10); or}$$

CT2, CT4 and a central thickness of the fifth lens element along the optical axis, CT5, could be controlled to satisfy the equation as follows:

$$1.70 \leq (CT2+CT4)/CT5 \qquad \text{Equation (11); or}$$

CT1, CT5 and AC34 could be controlled to satisfy the equation as follows:

$$1.80 \leq (CT1+AC34)/CT5 \quad \text{Equation (12); or}$$

$$2.20 \leq (CT1+AC34)/CT5 \quad \text{Equation (12'); or}$$

AC23, AC34 and AC56 could be controlled to satisfy the equation as follows:

$$1.80 \leq AC34/(AC23+AC56) \quad \text{Equation (13); or}$$

CT5 and AC34 could be controlled to satisfy the equation as follows:

$$1.00 \leq AC34/CT5 \quad \text{Equation (14); or}$$

CT4, AC23 and AC56 could be controlled to satisfy the equation as follows:

$$1.00 \leq CT4/(AC23+AC56) \quad \text{Equation (15); or}$$

CT2, CT3 and AC34 could be controlled to satisfy the equation as follows:

$$2.80 \leq (CT2+AC34)/CT3 \quad \text{Equation (16); or}$$

CT1, CT4 and CT5 could be controlled to satisfy the equation as follows:

$$1.80 \leq (CT1+CT4)/CT5 \quad \text{Equation (17).}$$

Aforesaid exemplary embodiments are not limited and could be selectively incorporated in other embodiments described herein.

In some exemplary embodiments, more details about the convex or concave surface structure could be incorporated for one specific lens element or broadly for plural lens elements to enhance the control for the system performance and/or resolution. It is noted that the additional details could be incorporated in example embodiments if no inconsistency occurs.

In another exemplary embodiment, a mobile device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, the substrate is for positioning the module housing unit; and the image sensor is positioned at the image side of the optical imaging lens.

Through controlling the convex or concave shape of the surfaces and/or the refracting power of the lens element(s), the mobile device and the optical imaging lens thereof in exemplary embodiments achieve good optical characters and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 28 is a table of optical data for each lens element of the optical imaging lens of a seventh embodiment of the present disclosure;

FIG. 29 is a table of aspherical data of a seventh embodiment of the optical imaging lens according to the present disclosure;

FIG. 32 is a table of optical data for each lens element of the optical imaging lens of an eighth embodiment of the present disclosure;

FIG. 33 is a table of aspherical data of an eighth embodiment of the optical imaging lens according to the present disclosure;

FIG. 36 is a table of optical data for each lens element of the optical imaging lens of a ninth embodiment of the present disclosure;

FIG. 37 is a table of aspherical data of a ninth embodiment of the optical imaging lens according to the present disclosure;

FIG. 40 is a table of optical data for each lens element of the optical imaging lens of a tenth embodiment of the present disclosure;

FIG. 41 is a table of aspherical data of a tenth embodiment of the optical imaging lens according to the present disclosure;

FIG. 42 is a table for the values of (CT4+AC34)/CT3, AC34/(AC45+AC56), (CT1+AC34)/CT6, AC34/CT3, (CT2+CT4)/CT6, AC34/AC23, (CT1+CT2)/CT6, AC34/CT6, (CT1+AC34)/CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 of all ten example embodiments;

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
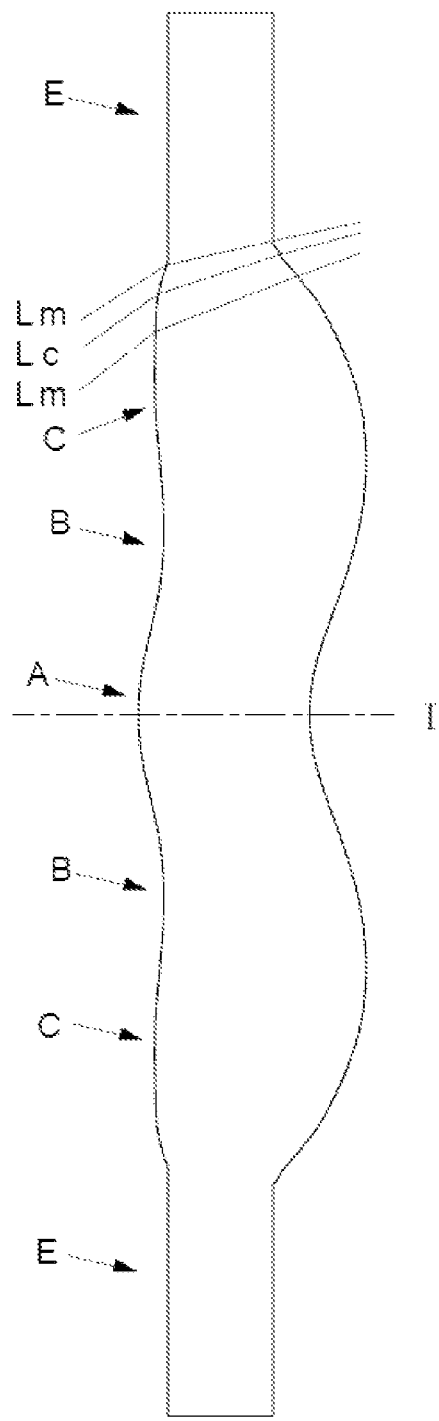
FIG. 1 is a cross-sectional view of one single lens element according to the present disclosure.

Here in the present specification, "a lens element having positive refracting power (or negative refracting power)" means that the lens element has positive refracting power (or negative refracting power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. Taking FIG. 1 for example, the lens element shown therein is radially symmetric around the optical axis which is labeled by I. The object-side surface of the lens element comprises a convex portion at region A, a concave portion at region B, and another convex portion at region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

In the present invention, examples of an optical imaging lens which is a prime lens are provided. Example embodiments of an optical imaging lens may comprise a first lens element, an aperture stop, a second lens element, a third lens element, a fourth lens element, a fifth lens element and a sixth lens element, each of the lens elements has refracting power and comprises an object-side surface facing toward an object side and an image-side surface facing toward an image side. These lens elements may be arranged sequencially from the object side to the image side along an optical axis, and example embodiments of the lens as a whole may comprise only the six lens elements having refracting power. In an example embodiment: the object-side surface of the first lens element comprises a convex portion in a vicinity of the optical axis; the image-side surface of the second lens element comprises a convex portion in a vicinity of a periphery of the second lens element; the third lens element has negative refracting power; the image-side surface of the fourth lens element comprises a convex portion in a vicinity of a periphery of the fourth lens element; and the image-side surface of the sixth lens element comprises a concave portion in a vicinity of the optical axis and a convex portion in a vicinity of a periphery of the sixth lens element.

Preferably, the lens elements are designed in light of the optical characteristics and the length of the optical imaging lens. For example, the first lens element with the convex portion in a vicinity of the optical axis formed on the object-side surface thereof can assist in collecting light to shorten the length of the optical imaging lens. Then, combining this with the aperture stop positioned between the first and second lens elements as well as the negative refracting power of the third lens element, the image quality is sustained. Further, combining these with the second lens element formed with the convex portion in a vicinity of a periphery of the second lens element on the image-side surface thereof, the fourth lens element formed with the convex portion in a vicinity of a periphery of the fourth lens element on the image-side surface thereof and the sixth lens element formed with the concave portion in a vicinity of the optical axis and the convex portion in a vicinity of a periphery of the sixth lens element on the image-side surface thereof, the aberration of the optical imaging lens could be adjusted. Therefore, the image quality of the optical imaging lens could be further promoted.

In another exemplary embodiment, some equation (s) of parameters, such as those relating to the ratio among parameters could be taken into consideration. For example, a central thickness of the third lens element along the optical axis, CT3, a central thickness of the fourth lens element along the optical axis, CT4, and an air gap between the third lens element and the fourth lens element along the optical axis, AC34, could be controlled to satisfy the equation as follows:

$2.20 \leq (CT4+AC34)/CT3$      Equation (1); or

AC34, an air gap between the fourth lens element and the fifth lens element along the optical axis, AC45, and an air gap between the fifth lens element and the sixth lens element along the optical axis, AC56, could be controlled to satisfy the equation as follows:

$1.00 \leq AC34/(AC45+AC56)$      Equation (2); or

AC34, a central thickness of the first lens element along the optical axis, CT1, and a central thickness of the sixth lens element along the optical axis, CT6, could be controlled to satisfy the equation as follows:

$2.00 \leq (CT1+AC34)/CT6$      Equation (3); or

AC34 and CT3 could be controlled to satisfy the equation as follows:

$1.60 \leq AC34/CT3$      Equation (4); or

CT4, CT6 and a central thickness of the second lens element along the optical axis, CT2, could be controlled to satisfy the equation as follows:

$2.48 \leq (CT2+CT4)/CT6$      Equation (5); or

AC34 and an air gap between the second lens element and the third lens element along the optical axis, AC23, could be controlled to satisfy the equation as follows:

$3.30 \leq AC34/AC23$      Equation (6); or

CT1, CT2 and CT6 could be controlled to satisfy the equation as follows:

$2.00 \leq (CT1+CT2)/CT6$      Equation (7); or

CT6 and AC34 could be controlled to satisfy the equation as follows:

$1.00 \leq AC34/CT6$      Equation (8); or

CT1, CT3 and AC34 could be controlled to satisfy the equation as follows:

$2.20 \leq (CT1+AC34)/CT3$      Equation (9); or

AC45 and an air gap between the first lens element and the second lens element along the optical axis, AC12, could be controlled to satisfy the equation as follows:

$0.90 \leq AC12/AC45$      Equation (10); or

CT2, CT4 and a central thickness of the fifth lens element along the optical axis, CT5, could be controlled to satisfy the equation as follows:

$1.70 \leq (CT2+CT4)/CT5$      Equation (11); or

CT1, CT5 and AC34 could be controlled to satisfy the equation as follows:

$1.80 \leq (CT1+AC34)/CT5$      Equation (12); or $2.20 \leq (CT1+AC34)/CT5$      Equation (12'); or AC23, AC34 and AC56 could be controlled to satisfy the equation as follows:

$1.80 \leq AC34/(AC23+AC56)$      Equation (13); or

CT5 and AC34 could be controlled to satisfy the equation as follows:

$1.00 \leq AC34/CT5$      Equation (14); or

CT4, AC23 and AC56 could be controlled to satisfy the equation as follows:

$1.00 \leq CT4/(AC23+AC56)$      Equation (15); or

CT2, CT3 and AC34 could be controlled to satisfy the equation as follows:

$2.80 \leq (CT2+AC34)/CT3$      Equation (16); or

CT1, CT4 and CT5 could be controlled to satisfy the equation as follows:

$1.80 \leq (CT1+CT4)/CT5$      Equation (17).

Aforesaid exemplary embodiments are not limited and could be selectively incorporated in other embodiments described herein.

Reference is now made to Equation (1). (CT4+AC34)/CT3 is formed by CT4, AC34, which potential to be shortened tend to be limited more, and CT3, which potential to be shortened tends to be limited less. The reason why the shortening of CT4 and AC34 faces more limitation is that the negative refracting power of the third lens element which requires a wide air gap, AC34, for dispersing the light on a certain level when entering the fourth lens element. Meanwhile, the diameter for passing light in the fourth lens element is so big that the thickness of the fourth lens element has less potential to be shortened, but the diameter for passing light in the third lens element is relatively small to allow a thinner thickness. The value of (CT4+AC34)/CT3 is suggested for a lower limit to configure CT3, CT4 and AC34 properly, such as 2.20 to satisfying Equation (1), and preferably, it is suggested to be within 2.20~7.80.

Reference is now made to Equation (2). As mentioned above, considering the shortening of AC has less potential, the shortening of AC45 has more potential due to the convex portion in a vicinity of a periphery of the fourth lens element formed on the image-side surface thereof, and shortening AC56 with a great portion also assists in shortening the length of the optical imaging lens, here the value of AC34/(AC45+AC56) is suggested for a lower limit to configure AC34, AC45 and AC56 properly, such as 1.00 to satisfying Equation (2), and preferably, it is suggested to be within 1.00~4.80.

Reference is now made to Equation (3). Considering the shortening of CT1 is limited to the light collection required in the system and the limitation of the shortening of AC34 as mentioned above, here the shortening of CT6 has more potential. Thus, the value of (CT1+AC34)/CT6 is suggested for a lower limit to shorten the length of the optical imaging lens, such as 2.00 to satisfying Equation (3), and preferably, it is suggested to be within 2.00~6.30.

Reference is now made to Equation (4). Considering that the shortening of AC34 has less potential and the shortening of CT3 has more potential as mentioned above, the value of AC34/CT3 is suggested for a lower limit to configure the value of AC3 and CT3 properly, such as 1.60 to satisfy Equation (4), and preferably, it is suggested to be within 1.60~3.60.

Reference is now made to Equation (5). Considering that the optical characters and the manufacture difficulty of the optical imaging lens, here the value of (CT2+CT4)/CT6 is suggested for a lower limit to configure the value of CT2, CT4 and CT6 properly, such as 2.48 to satisfying Equation (5), and preferably, it is suggested to be within 2.48~5.70.

Reference is now made to Equation (6). As mentioned before, considering that the shortening of AC34 has less potential and the shortening of AC23 has more potential for the convex portion in a vicinity of a periphery of the second lens element formed on the image-side surface thereof, here the value of AC34/AC23 is suggested for a lower limit, such as 3.30 to satisfy Equation (6), and preferably, it is suggested to be within 3.30~15.70.

Reference is now made to Equation (7). As mentioned before, considering that the shortening of CT1 and CT2 have less potential and the shortening of CT6 has more potential relatively, here the value of (CT1+CT2)/CT6 is suggested for a lower limit to configure the value of CT1, CT2 and CT6 properly, such as 2.00 to satisfy Equation (7), and preferably, it is suggested to be within 2.00~5.50.

Reference is now made to Equation (8). As mentioned before, considering that the shortening of AC34 have less potential and the shortening of CT6 has more potential relatively, here the value of AC34/CT6 is suggested for a lower limit to configure the value of AC34 and CT6 properly, such as 1.00 to satisfy Equation (8), and preferably, it is suggested to be within 1.00~3.30.

Reference is now made to Equation (9). As mentioned before, considering that the shortening of AC34 and CT1 have less potential and the shortening of CT3 has more potential relatively because of its negative refracting power, here the value of (CT1+AC34)/CT3 is suggested for a lower limit, such as 2.20 to satisfy Equation (9), and preferably, it is suggested to be within 2.20~5.50.

Reference is now made to Equation (10). Considering the shortening of AC12 has less potential compared with the shortening of AC45 due to the position of the aperture stop, which is between the first and second lens element, here the value of AC12/AC45 is suggested for a lower limit, such as 0.90 to satisfying Equation (10), and preferably, it is suggested to be within 0.90~2.50.

Reference is now made to Equation (11). Considering that the optical characters and the manufacture difficulty of the optical imaging lens, here the value of (CT2+CT4)/CT5 is suggested for a lower limit to configure the value of CT2, CT4 and CT5 properly, such as 1.70 to satisfying Equation (11), and preferably, it is suggested to be within 1.70~6.70.

Reference is now made to Equations (12) and (12'). As mentioned before, considering that the shortening of AC34 and CT1 have less potential and the shortening of CT5 has more potential relatively, here the value of (CT1+AC34)/CT5 is suggested for a lower limit to configure the value of CT1, CT5 and AC34 properly, such as 1.80 to satisfy Equation (12) or 2.20 to satisfy Equation (12'), and preferably, it is suggested to be within 1.80~6.70.

Reference is now made to Equation (13). Considering that the optical characters and the manufacture difficulty of the optical imaging lens, here the value of AC34/(AC23+AC56) is suggested for a lower limit to configure the value of AC23, AC34 and AC56 properly, such as 1.80 to satisfying Equation (13), and preferably, it is suggested to be within 1.80~8.50.

Reference is now made to Equation (14). As mentioned before, considering that the shortening of AC34 and CT5 have less potential and the shortening of CT5 has more potential relatively, here the value of AC34/CT5 is suggested for a lower limit to configure the value of CT5 and AC34 properly, such as 1.00 to satisfy Equation (14), and preferably, it is suggested to be within 1.00~3.50.

Reference is now made to Equation (15). Considering that the shortening of CT4 has less potential due to the great diameter for passing light thereon and the shortening of AC23 and AC56 have more potential relatively, here the value of CT4/(AC23+AC56) is suggested for a lower limit to shorten the length of the optical imaging lens, such as 1.00 to satisfy Equation (15), and preferably, it is suggested to be within 1.00~11.00.

Reference is now made to Equation (16). Considering that the shortening of CT3 has more potential due to the negative refracting power and the smaller diameter for passing light thereon, here the value of (CT2+AC34)/CT3 is suggested for a lower limit to shorten the length of the optical imaging lens, such as 2.80 to satisfy Equation (16), and preferably, it is suggested to be within 2.80~5.80.

Reference is now made to Equation (17). Considering that the optical characters and the manufacture difficulty of the optical imaging lens, here the value of (CT1+CT4)/CT5 is suggested for a lower limit to configure the value of CT1, CT4 and CT5 properly, such as 1.80 to satisfying Equation (17), and preferably, it is suggested to be within 1.80~7.50.

When implementing example embodiments, more details about the convex or concave surface structure may be incorporated for one specific lens element or broadly for plural lens elements to enhance the control for the system performance and/or resolution, as illustrated in the following embodiments. It is noted that the additional details could be incorporated in example embodiments if no inconsistency occurs.

Figure 2:
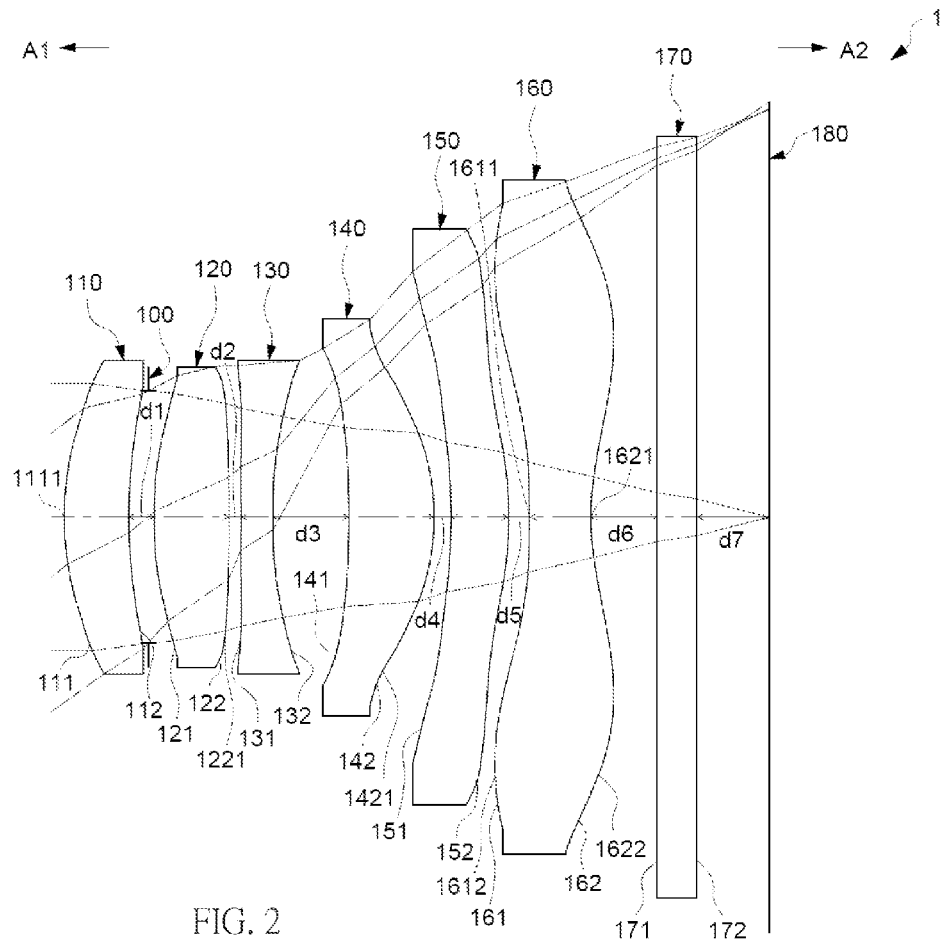
FIG. 2 is a cross-sectional view of a first embodiment of an optical imaging lens having six lens elements according to the present disclosure.
Figure 3:
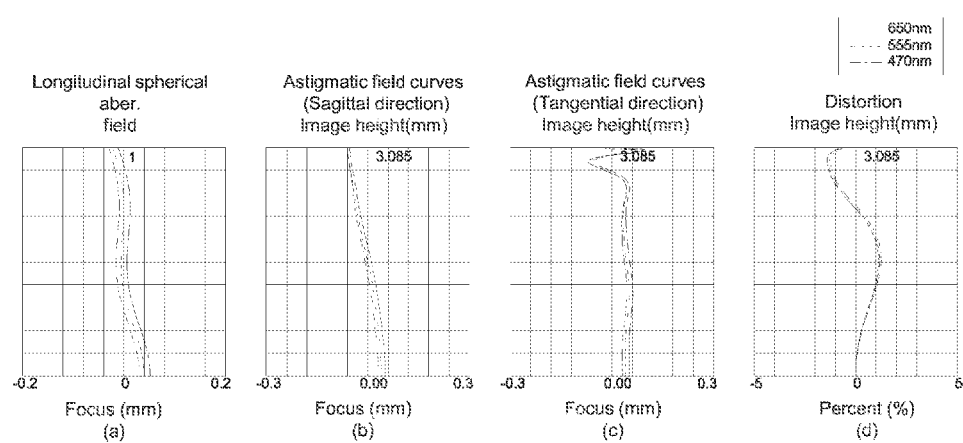
FIG. 3 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characters and a shortened length. Reference is now made to FIGS. 2-5. FIG. 2 illustrates an example cross-sectional view of an optical imaging lens 1 having six lens elements of the optical imaging lens according to a first example embodiment. FIG. 3 shows example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 2, the optical imaging lens 1 of the present embodiment comprises, in order from an object side A1 to an image side A2 along an optical axis, a first lens element 110, an aperture stop 100, a second lens element 120, a third lens element 130, a fourth lens element 140, a fifth lens element 150 and a sixth lens element 16. A filtering unit 170 and an image plane 180 of an image sensor are positioned at the image side A2 of the optical lens 1. Each of the first, second, third, fourth, fifth, sixth lens elements 110, 120, 130, 140, 150, 160 and the filtering unit 170 comprises an object-side surface 111/121/131/141/151/161/171 facing toward the object side A1 and an image-side surface 112/122/132/142/152/162/172 facing toward the image side A2. The example embodiment of the filtering unit 170 illustrated is an IR cut filter (infrared cut filter) positioned between the sixth lens element 160 and an image plane 180. The filtering unit 170 selectively absorbs light with specific wavelength from the light passing optical imaging lens 1. For example, IR light is absorbed, and this will prohibit the IR light which is not seen by human eyes from producing an image on the image plane 180.

Please noted that during the normal operation of the optical imaging lens 1, the distance between any two adjacent lens elements of the first, second, third, fourth, fifth, sixth lens elements 110, 120, 130, 140, 150, 160 is a unchanged value, i.e. the optical imaging lens 1 is a prime lens.

Exemplary embodiments of each lens element of the optical imaging lens 1 which may be constructed by plastic material will now be described with reference to the drawings.

An example embodiment of the first lens element 110 may have positive refracting power. The object-side surface 111 is a convex surface comprising a convex portion 1111 in a vicinity of the optical axis, and the image-side surface 112 is a concave surface.

An example embodiment of the second lens element 120 may have positive refracting power. Both of the object-side surface 121 and image-side surface 122 are convex surfaces, and the image-side surface 122 further comprises a convex portion 1221 in a vicinity of a periphery of the second lens element 120.

An example embodiment of the third lens element 130 may have negative refracting power. Both of the object-side surface 131 and image-side surface 132 are concave surfaces.

An example embodiment of the fourth lens element 140 may have positive refracting power. The object-side surface 141 is a concave surface. The image-side surface 142 is a convex surface comprising a convex portion 1421 in a vicinity of a periphery of the fourth lens element 140.

An example embodiment of the fifth lens element 150 may have positive refracting power. The object-side surface 151 is a concave surface, and the image-side surface 152 is a convex surface.

An example embodiment of the sixth lens element 160 may have negative refracting power. The object-side surface 161 comprises a concave portion 1611 in a vicinity of the optical axis and a convex portion 1612 in a vicinity of a periphery of the sixth lens element 160. The image-side surface 162 comprises a concave portion 1621 in a vicinity of the optical axis and a convex portion 1622 in a vicinity of a periphery of the sixth lens element 160.

In example embodiments, air gaps exist between the lens elements 110, 120, 130, 140, 150, 160, the filtering unit 170 and the image plane 180 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the sixth lens element 160, the air gap d6 existing between the sixth lens element 160 and the filtering unit 170 and the air gap d7 existing between the filtering unit 170 and the image plane 180 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by AC12, the air gap d2 is denoted by AC23, the air gap d3 is denoted by AC34, the air gap d4 is denoted by AC45, and the air gap d5 is denoted by AC56.

FIG. 4 depicts the optical characters of each lens elements in the optical imaging lens 1 of the present embodiment, wherein the values of (CT4+AC34)/CT3, AC34/(AC45+AC56), (CT1+AC34)/CT6, AC34/CT3, (CT2+CT4)/CT6, AC34/AC23, (CT1+CT2)/CT6, AC34/CT6, (CT1+AC34)/CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 are:

$(CT4+AC34)/CT3=4.99;$ $AC34/(AC45+AC56)=2.00;$ $(CT1+AC34)/CT6=2.35;$ $AC34/CT3=2.36;$ $(CT2+CT4)/CT6=2.70;$ $AC34/AC23=5.78;$ $(CT1+CT2)/CT6=2.39;$ $AC34/CT6=1.26;$ $(CT1+AC34)/CT3=4.40;$ $AC12/AC45=1.59;$ $(CT2+CT4)/CT5=2.75;$ $(CT1+AC34)/CT5=2.40;$ $AC34/(AC23+AC56)=2.22;$ $AC34/CT5=1.28;$ $CT4/(AC23+AC56)=2.48;$ $(CT2+AC34)/CT3=4.78;$ $(CT1+CT4)/CT5=2.55.$

The distance from the object-side surface 111 of the first lens element 110 to the image plane 180 along the optical axis is 5.32 mm, and the length of the optical imaging lens 1 is shortened.

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150 and the object-side surface 161 and the image-side surface 162 of the sixth lens element 160 are all defined by the following aspherical formula:

$$Z(Y) = \frac{Y^2}{R} \Big/ \left(1 + \sqrt{1 - (1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ order.

The values of each aspherical parameter are shown in FIG. 5.

As illustrated in FIG. 3, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.06 mm. Therefore, the present embodiment improves the longitudinal spherical aberration with respect to different wavelengths.

Please refer to FIG. 3, astigmatism aberration in the sagittal direction (b) and astigmatism aberration in the tangential direction (c). The focus variation with respect to the three wavelengths in the whole field falls within ±0.12 mm. This reflects the optical imaging lens 1 of the present embodiment eliminates aberration effectively. Additionally, the closed curves represents dispersion is improved.

Please refer to FIG. 3, distortion aberration (d), which showing the variation of the distortion aberration is within ±2.0%. Such distortion aberration meets the requirement of acceptable image quality and shows the optical imaging lens 1 of the present embodiment could restrict the distortion aberration to raise the image quality even though the length of the optical imaging lens 1 is shortened to 5.32 mm.

Therefore, the optical imaging lens 1 of the present embodiment shows great characteristics in the longitudinal spherical aberration, astigmatism in the sagittal direction, astigmatism in the tangential direction, and distortion aberration. According to above illustration, the optical imaging lens 1 of the example embodiment indeed achieves great optical performance and the length of the optical imaging lens 1 is effectively shortened.

Figure 6:
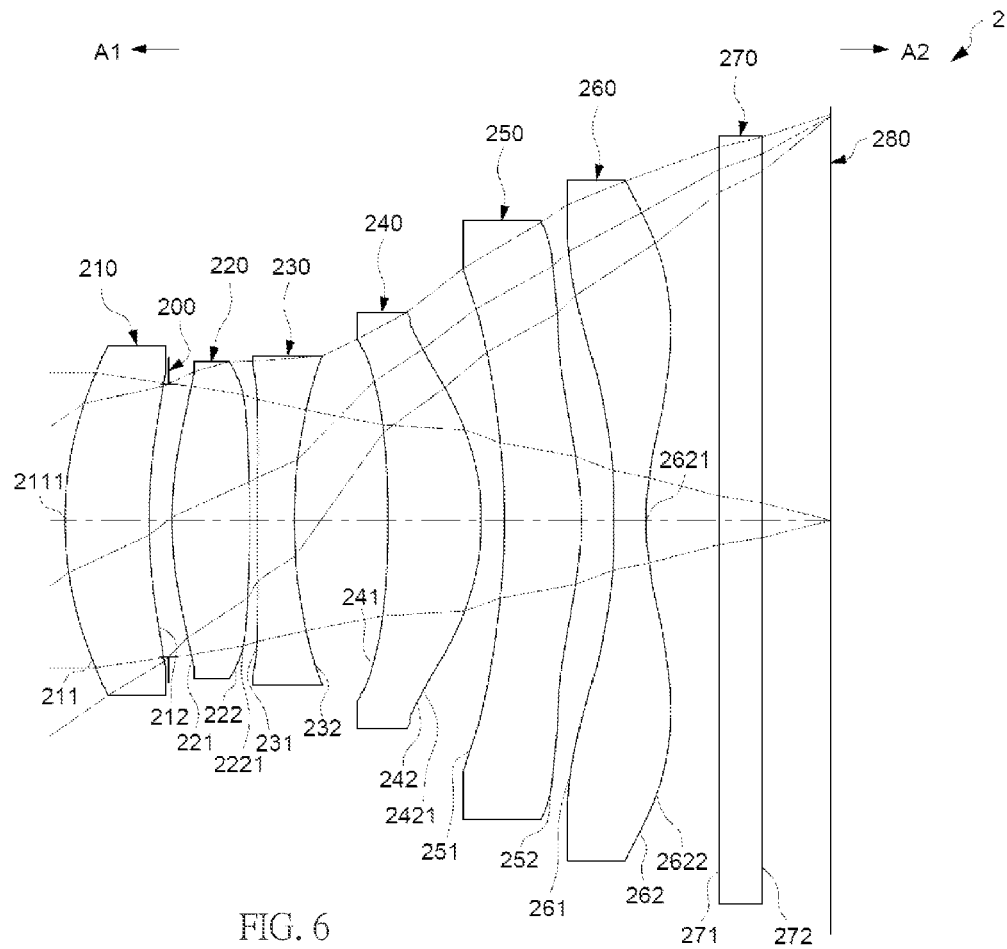
FIG. 6 is a cross-sectional view of a second embodiment of an optical imaging lens having six lens elements according to the present disclosure.
Figure 7:
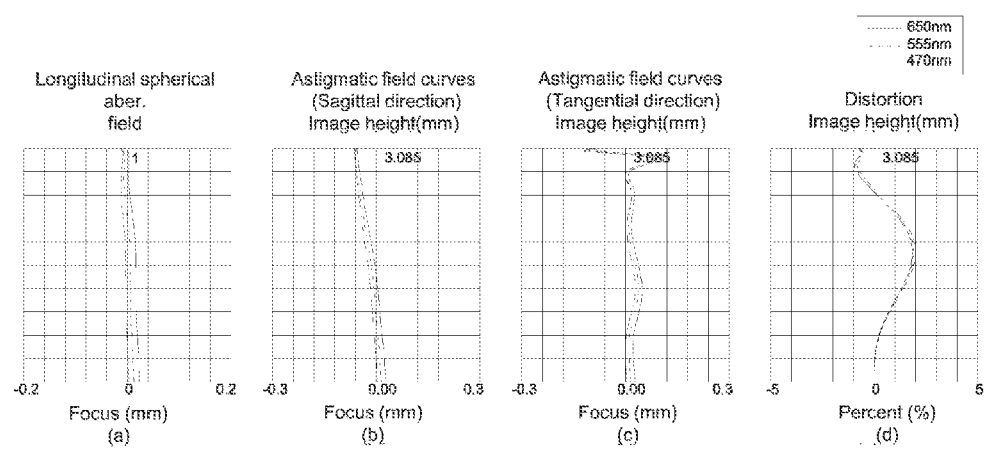
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having six lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment.

The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises a first lens element 210, an aperture stop 200, a second lens element 220, a third lens element 230, a fourth lens element 240, a fifth lens element 250 and a sixth lens element 260.

The differences between the second embodiment and the first embodiment are the radius of curvature and thickness of each lens element, the distance of each air gap and the configuration of the concave/convex shape of the object-side surface 261, but the configuration of the positive/negative refracting power of the first, second, third, fourth, fifth and sixth lens elements 210, 220, 230, 240, 250, 260 and configuration of the concave/convex shape of surfaces, comprising the object-side surfaces 211, 221, 231, 241, 251 facing to the object side A1 and the image-side surfaces 212, 222, 232, 242, 252, 262 facing to the image side A2, are similar to those in the first embodiment. Specifically, the object-side surface 261 of the sixth lens element 260 is a concave surface. Please refer to FIG. 8 for the optical characteristics of each lens elements in the optical imaging lens 2 of the present embodiment, wherein the values of (CT4+AC34)/CT3, AC34/(AC45+AC56), (CT1+AC34)/CT6, AC34/CT3, (CT2+CT4)/CT6, AC34/AC23, (CT1+CT2)/CT6, AC34/CT6, (CT1+AC34)/CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 are:

(CT4+AC34)/CT3=5.08;

AC34/(AC45+AC56)=1.67;

(CT1+AC34)/CT6=5.59;

AC34/CT3=2.55;

(CT2+CT4)/CT6=5.32;

AC34/AC23=10.74;

(CT1+CT2)/CT6=5.07;

AC34/CT6=2.93;

(CT1+AC34)/CT3=4.86;

AC12/AC45=0.99;

(CT2+CT4)/CT5=2.22;

(CT1+AC34)/CT5=2.33;

AC34/(AC23+AC56)=2.23;

AC34/CT5=1.22;

CT4/(AC23+AC56)=2.22;

(CT2+AC34)/CT3=4.64;

(CT1+CT4)/CT5=2.32.

The distance from the object-side surface 211 of the first lens element 210 to the image plane 280 along the optical axis is 5.27 mm and the length of the optical imaging lens 2 is shortened.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
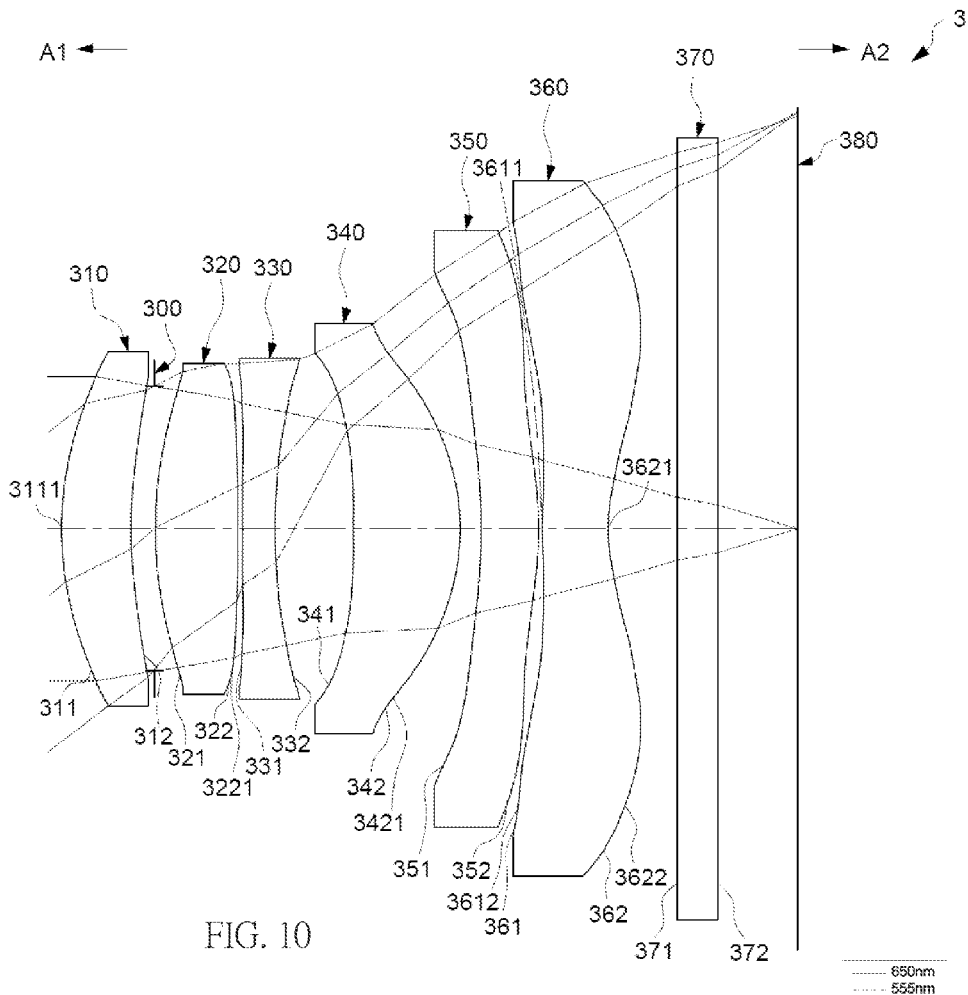
FIG. 10 is a cross-sectional view of a third embodiment of an optical imaging lens having six lens elements according to the present disclosure.
Figure 11:
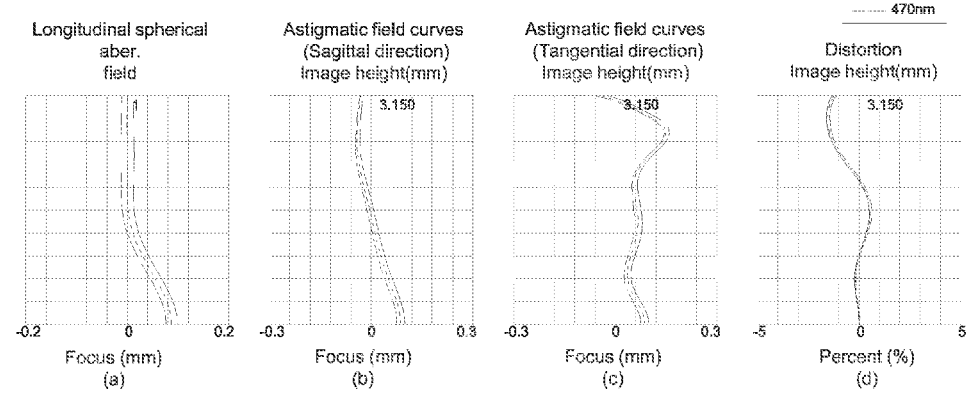
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having six lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises a first lens element 310, an aperture stop 300, a second lens element 320, a third lens element 330, a fourth lens element 340, a fifth lens element 350 and a sixth lens element 360.

The differences between the third embodiment and the first embodiment are the radius of curvature and thickness of each lens element, the distance of each air gap and the surface shape of the object-side surface 361, but the configuration of the positive/negative refracting power of the first, second, third, fourth, fifth and sixth lens elements 310, 320, 330, 340, 350, 360 and configuration of the concave/convex shape of surfaces, comprising the object-side surfaces 311, 321, 331, 341, 351 facing to the object side A1 and the image-side surfaces 312, 322, 332, 342, 352, 362 facing to the image side A2, are similar to those in the first embodiment. Specifically, the object-side surface 361 of the sixth lens element 360 comprises a convex portion 3611 in a vicinity of the optical axis and a concave portion 3612 in a vicinity of a periphery of the sixth lens element 360. Please refer to FIG. 12 for the optical characteristics of each lens elements in the optical imaging lens 3 of the present embodiment, wherein the values of (CT4+AC34)/CT3, AC34/(AC45+AC56), (CT1+AC34)/CT6, AC34/CT3, (CT2+CT4)/CT6, AC34/AC23, (CT1+CT2)/CT6, AC34/CT6, (CT1+AC34)/CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 are:

(CT4+AC34)/CT3=5.70;

AC34/(AC45+AC56)=3.06;

(CT1+AC34)/CT6=2.24;

AC34/CT3=2.42;

(CT2+CT4)/CT6=2.85;

AC34/AC23=15.36;

(CT1+CT2)/CT6=2.30;

AC34/CT6=1.19;

(CT1+AC34)/CT3=4.58;

AC12/AC45=1.15;

(CT2+CT4)/CT5=3.29;

(CT1+AC34)/CT5=2.58;

AC34/(AC23+AC56)=8.06;

AC34/CT5=1.37;

CT4/(AC23+AC56)=10.89;

(CT2+AC34)/CT3=4.97;

(CT1+CT4)/CT5=3.06.

The distance from the object-side surface 311 of the first lens element 310 to the image plane 380 along the optical axis is 5.40 mm and the length of the optical imaging lens 3 is shortened.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 3 is effectively shortened.

Figure 14:
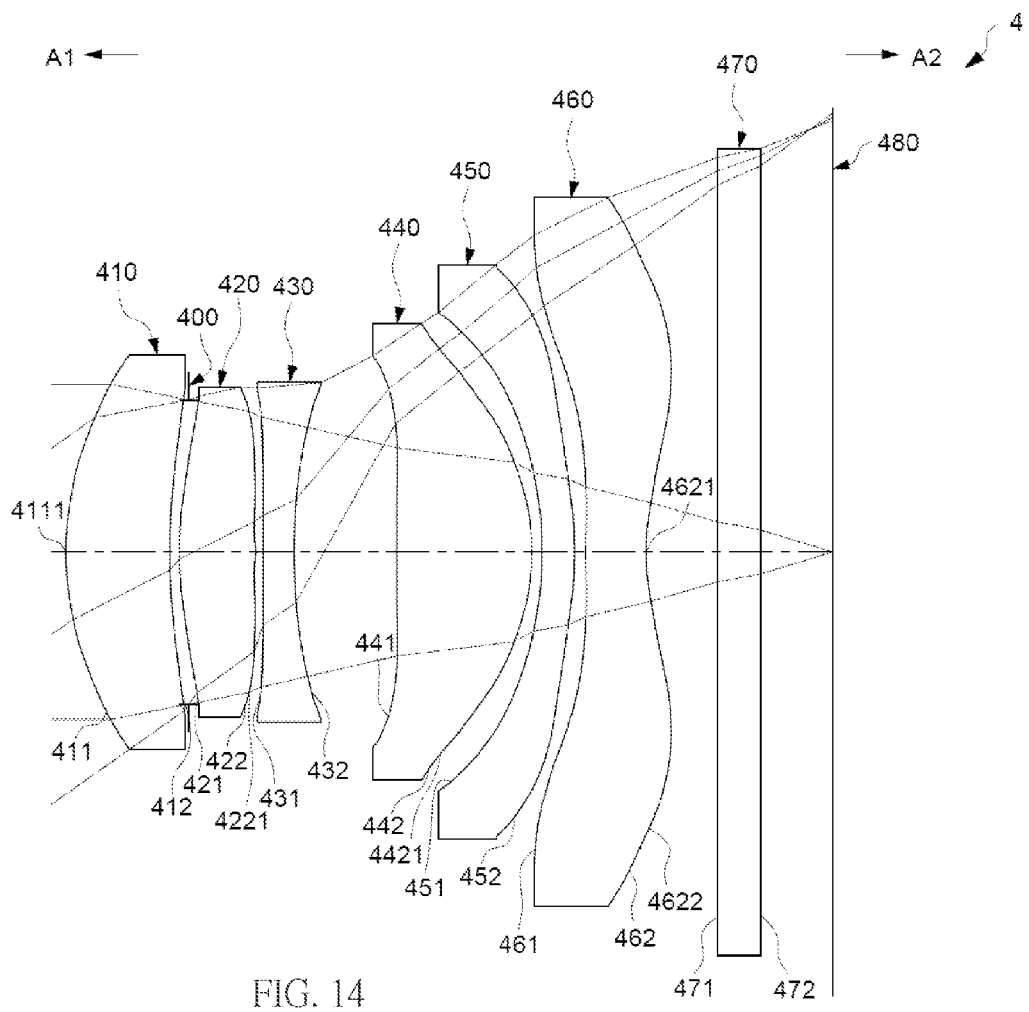
FIG. 14 is a cross-sectional view of a fourth embodiment of an optical imaging lens having six lens elements according to the present disclosure.
Figure 15:
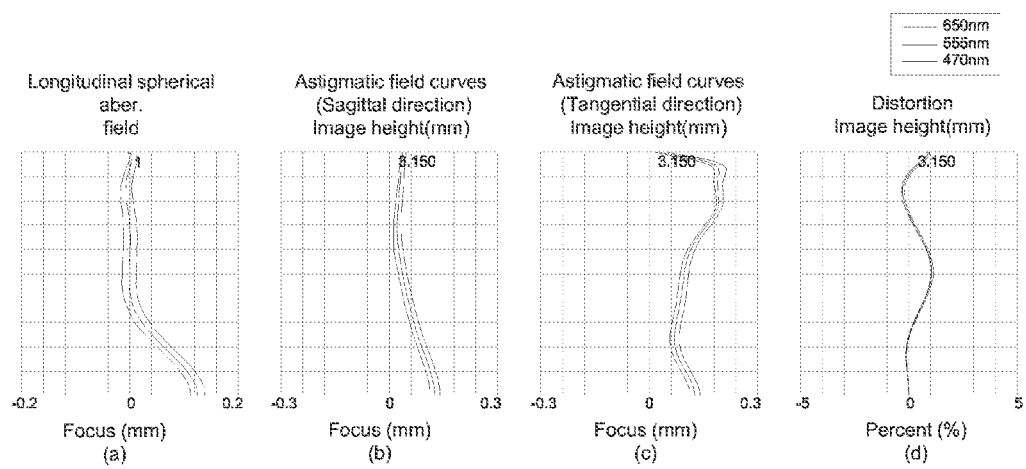
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having six lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises a first lens element 410, an aperture stop 400, a second lens element 420, a third lens element 430, a fourth lens element 440, a fifth lens element 450 and a sixth lens element 460.

The differences between the fourth embodiment and the first embodiment are the radius of curvature and thickness of each lens element, the distance of each air gap and the configuration of the concave/convex shape of the object-side surface 461, but the configuration of the positive/negative refracting power of the first, second, third, fourth, fifth and sixth lens elements 410, 420, 430, 440, 450, 460 and configuration of the concave/convex shape of surfaces, comprising the object-side surfaces 411, 421, 431, 441, 451 facing to the object side A1 the image-side surfaces 412, 422, 432, 442, 452, 462 facing to the image side A2, are similar to those in the first embodiment. Specifically, the object-side surface 461 of the sixth lens element 460 is a concave surface. Please refer to FIG. 16 for the optical characteristics of each lens elements in the optical imaging lens 4 of the present embodiment, wherein the values of (CT4+AC34)/CT3, AC34/(AC45+ AC56), (CT1+AC34)/CT6, AC34/CT3, (CT2+CT4)/CT6, AC34/AC23, (CT1+CT2)/CT6, AC34/CT6, (CT1+AC34)/ CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 are:

$(CT4+AC34)/CT3=7.52;$ $AC34/(AC45+AC56)=4.56;$ $(CT1+AC34)/CT6=3.45;$ $AC34/CT3=3.28;$ $(CT2+CT4)/CT6=3.49;$ $AC34/AC23=14.58;$ $(CT1+CT2)/CT6=2.98;$ $AC34/CT6=1.73;$ $(CT1+AC34)/CT3=3.45;$ $AC12/AC45=0.96;$ $(CT2+CT4)/CT5=6.44;$ $(CT1+AC34)/CT5=6.35;$ $AC34/(AC23+AC56)=5.44;$ $AC34/CT5=3.18;$ $CT4/(AC23+AC56)=7.02;$ $(CT2+AC34)/CT3=5.68;$ $(CT1+CT4)/CT5=7.28.$

The distance from the object-side surface 411 of the first lens element 410 to the image plane 480 along the optical axis is 5.41 mm and the length of the optical imaging lens 4 is shortened.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 4 is effectively shortened.

Figure 18:
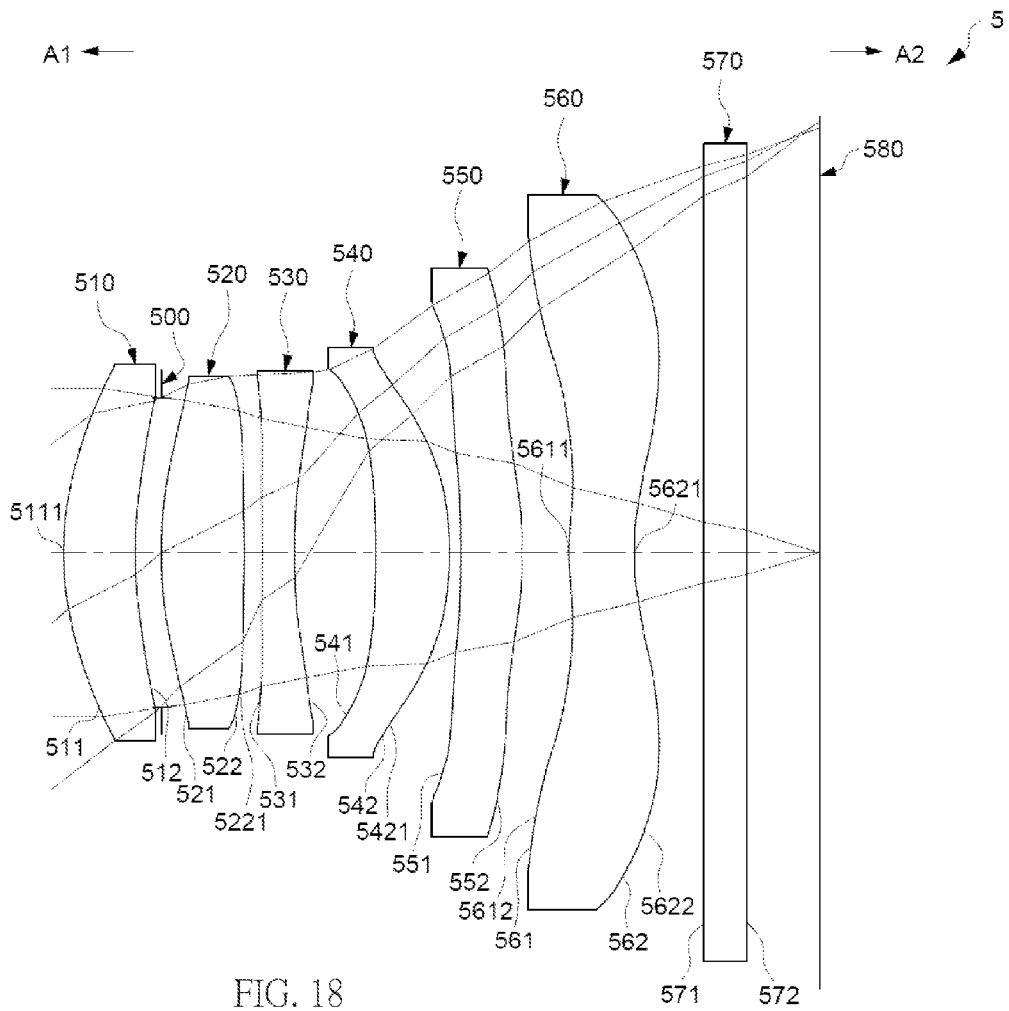
FIG. 18 is a cross-sectional view of a fifth embodiment of an optical imaging lens having six lens elements according to the present disclosure.
Figure 19:
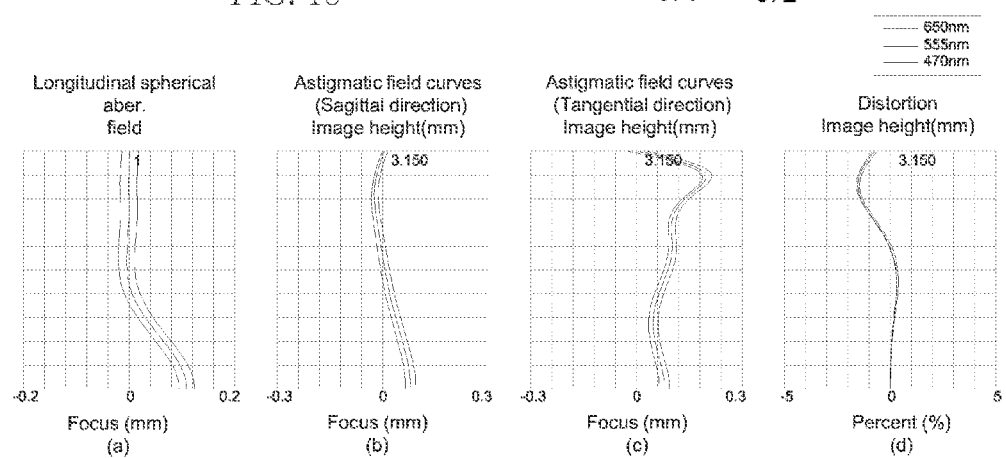
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having six lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises a first lens element 510, an aperture stop 500, a second lens element 520, a third lens element 530, a fourth lens element 540, a fifth lens element 550 and a sixth lens element 560.

The differences between the fifth embodiment and the first embodiment are the radius of curvature and thickness of each lens element, the distance of each air gap and the configuration of the concave/convex shape of the object-side surface 561, but the configuration of the positive/negative refracting power of the first, second, third, fourth, fifth and sixth lens elements 510, 520, 530, 540, 550, 560 and configuration of the concave/convex shape of surfaces, comprising the object-side surfaces 511, 521, 531, 541, 551 facing to the object side A1 and the image-side surfaces 512, 522, 532, 542, 552, 562 facing to the image side A2, are similar to those in the first embodiment. Specifically, the object-side surface 561 of the sixth lens element 560 is a convex surface comprises a convex portion 5611 in a vicinity of the optical axis and a concave portion 5612 in a vicinity of a periphery of the sixth lens element 560. Please refer to FIG. 20 for the optical characteristics of each lens elements in the optical imaging lens 5 of the present embodiment, wherein the values of (CT4+AC34)/ CT3, AC34/(AC45+AC56), (CT1+AC34)/CT6, AC34/CT3, (CT2+CT4)/CT6, AC34/AC23, (CT1+CT2)/CT6, AC34/ CT6, (CT1+AC34)/CT3, AC12/AC45, (CT2+CT4)/CT5, (CT1+AC34)/CT5, AC34/(AC23+AC56), AC34/CT5, CT4/ (AC23+AC56), (CT2+AC34)/CT3 and (CT1+CT4)/CT5 are:

$(CT4+AC34)/CT3=4.73;$ $AC34/(AC45+AC56)=1.28;$ $(CT1+AC34)/CT6=2.47;$ $AC34/CT3=2.48;$ $(CT2+CT4)/CT6=2.53;$ $AC34/AC23=4.41;$ $(CT1+CT2)/CT6=2.49;$ $AC34/CT6=1.32;$ $(CT1+AC34)/CT3=4.66;$ $AC12/AC45=2.16;$ $(CT2+CT4)/CT5=2.57;$ $(CT1+AC34)/CT5=2.52;$ $AC34/(AC23+AC56)=1.17;$ $AC34/CT5=1.34;$ $CT4/(AC23+AC56)=1.06;$ $(CT2+AC34)/CT3=5.00;$ $(CT1+CT4)/CT5=2.39.$

The distance from the object-side surface 511 of the first lens element 510 to the image plane 580 along the optical axis is 5.40 mm and the length of the optical imaging lens 5 is shortened.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
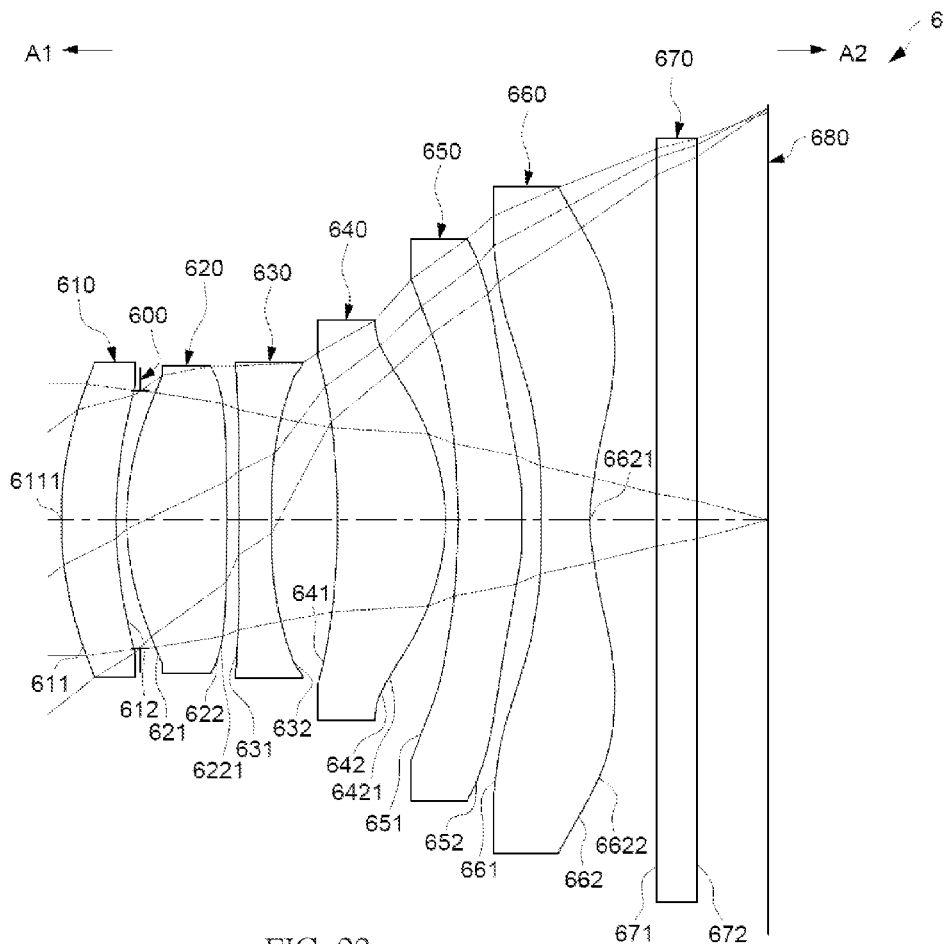
FIG. 22 is a cross-sectional view of a sixth embodiment of an optical imaging lens having six lens elements according to the present disclosure.
Figure 23:
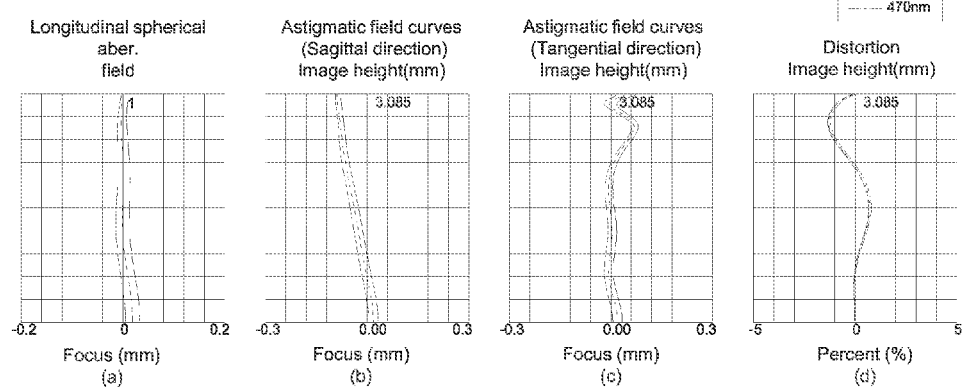
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having six lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises a first lens element 610, an aperture stop 600, a second lens element 620, a third lens element 630, a fourth lens element 640, a fifth lens element 650 and a sixth lens element 660.

The differences between the sixth embodiment and the first embodiment are the radius of curvature and thickness of each lens element, the distance of each air gap and the configuration of the concave/convex shape of object-side surface 661, but the configuration of the positive/negative refracting power of the first, second, third, fourth, fifth and sixth lens elements 610, 620, 630, 640, 650, 660 and configuration of the concave/convex shape of surfaces, comprising the object-side surfaces 611, 621, 631, 641, 651 facing to the object side A1 and the image-side surfaces 612, 622, 632, 642, 652, 662 facing to the image side A2, are similar to those in the first embodiment. Specifically, the object-side surfaces 661 of the sixth lens element 660 is a concave surface. Please refer to FIG. 24 for the optical characteristics of each lens elements in the optical imaging lens 6 of the present embodiment, wherein the values of (CT4+AC34)/CT3, AC34/(AC45+AC56), (CT1+AC34)/CT6, AC34/CT3, (CT2+CT4)/CT6, AC34/AC23, (CT1+CT2)/CT6, AC34/CT6, (CT1+AC34)/CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 are:

$(CT4+AC34)/CT3=5.45;$ $AC34/(AC45+AC56)=2.03;$ $(CT1+AC34)/CT6=2.48;$ $AC34/CT3=2.07;$ $(CT2+CT4)/CT6=4.27;$ $AC34/AC23=5.26;$ $(CT1+CT2)/CT6=3.16;$ $AC34/CT6=1.36;$ $(CT1+AC34)/CT3=3.76;$ $AC12/AC45=0.90;$ $(CT2+CT4)/CT5=3.23;$ $(CT1+AC34)/CT5=1.88;$ $AC34/(AC23+AC56)=2.06;$ $AC34/CT5=1.03;$ $CT4/(AC23+AC56)=3.36;$ $(CT2+AC34)/CT3=5.17;$ $(CT1+CT4)/CT5=2.53.$

The distance from the object-side surface 611 of the first lens element 610 to the image plane 680 along the optical axis is 5.30 mm and the length of the optical imaging lens 6 is shortened.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Figure 26:
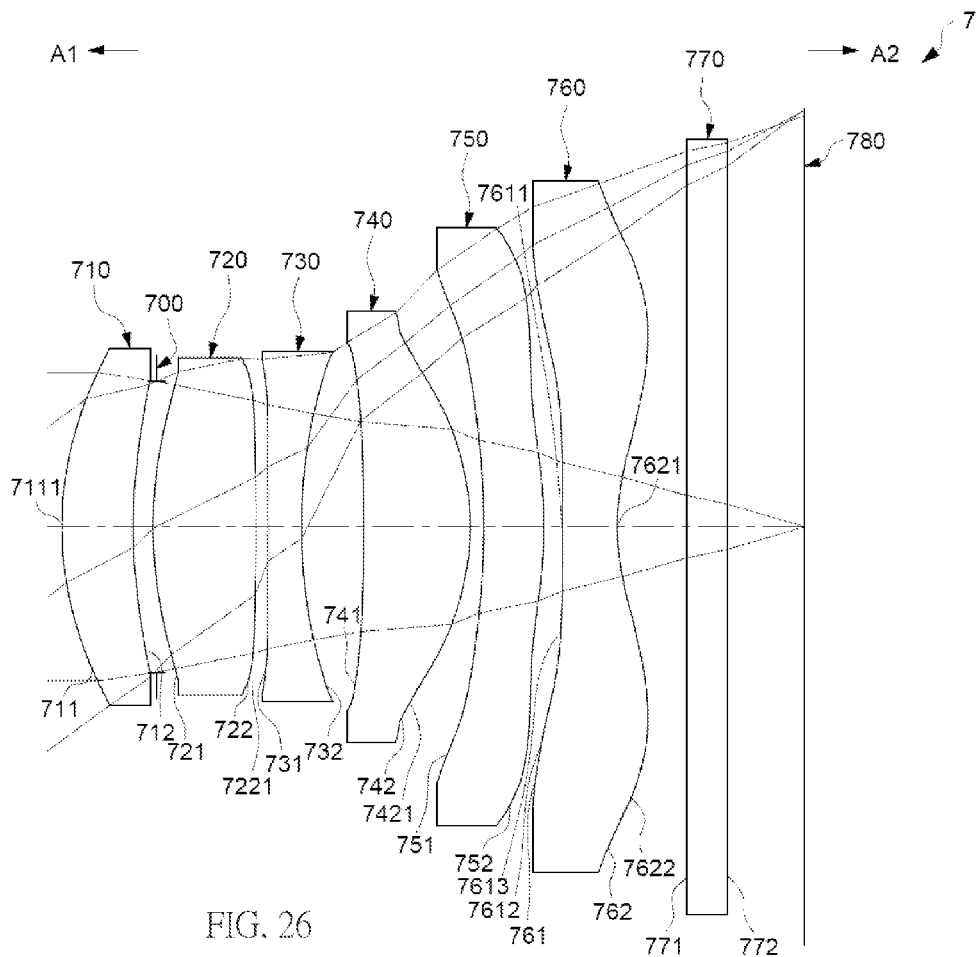
FIG. 26 is a cross-sectional view of a seventh embodiment of an optical imaging lens having six lens elements according to the present disclosure.
Figure 27:
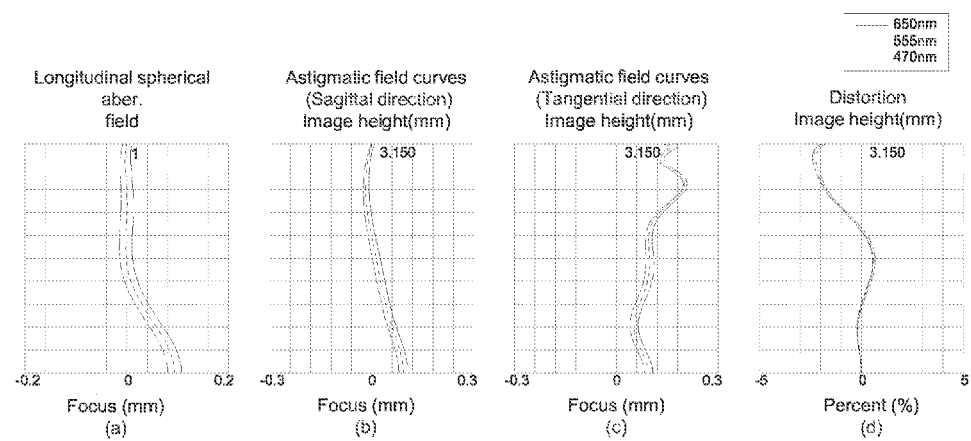
FIG. 27 is a chart of longitudinal spherical aberration and other kinds of optical aberrations of a seventh embodiment of the optical imaging lens according the present disclosure.

Reference is now made to FIGS. 26-29. FIG. 26 illustrates an example cross-sectional view of an optical imaging lens 7 having six lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises a first lens element 710, an aperture stop 700, a second lens element 720, a third lens element 730, a fourth lens element 740, a fifth lens element 750 and a sixth lens element 760.

The differences between the seventh embodiment and the first embodiment are the radius of curvature and thickness of each lens element, the distance of each air gap and the configuration of the concave/convex shape of the object-side surface 761, but the configuration of the positive/negative refracting power of the first, second, third, fourth, fifth and sixth lens elements 710, 720, 730, 740, 750, 760 and configuration of the concave/convex shape of surfaces, comprising the object-side surfaces 711, 721, 731, 741, 751 facing to the object side A1 and the image-side surfaces 712, 722, 732, 742, 752, 762 facing to the image side A2, are similar to those in the first embodiment. Specifically, the object-side surface 761 of the sixth lens element 760 comprises a convex portion 7611 in a vicinity of the optical axis, a convex portion 7612 in a vicinity of a periphery of the sixth lens element 760 and a concave portion 7613 between the vicinity of the optical axis and the vicinity of a periphery of the sixth lens element 760. Please refer to FIG. 28 for the optical characteristics of each lens elements in the optical imaging lens 7 of the present embodiment, wherein the values of (CT4+AC34)/CT3, AC34/(AC45+AC56), (CT1+AC34)/CT6, AC34/CT3, (CT2+CT4)/CT6, AC34/AC23, (CT1+CT2)/CT6, AC34/CT6, (CT1+AC34)/CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 are:

$(CT4+AC34)/CT3=4.97;$ $AC34/(AC45+AC56)=1.97;$ $(CT1+AC34)/CT6=2.37;$ $AC34/CT3=1.81;$ $(CT2+CT4)/CT6=3.74;$ $AC34/AC23=4.64;$ $(CT1+CT2)/CT6=3.10;$ $AC34/CT6=1.09;$ $(CT1+AC34)/CT3=3.92;$ $AC12/AC45=1.55;$ $(CT2+CT4)/CT5=3.42;$ $(CT1+AC34)/CT5=2.17;$ $AC34/(AC23+AC56)=1.97;$ $AC34/CT5=1.00;$ $CT4/(AC23+AC56)=3.45;$ $(CT2+AC34)/CT3=4.83;$ $(CT1+CT4)/CT5=2.92.$

The distance from the object-side surface 711 of the first lens element 710 to the image plane 780 along the optical axis is 5.40 mm and the length of the optical imaging lens 7 is shortened.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 7 is effectively shortened.

Figure 30:
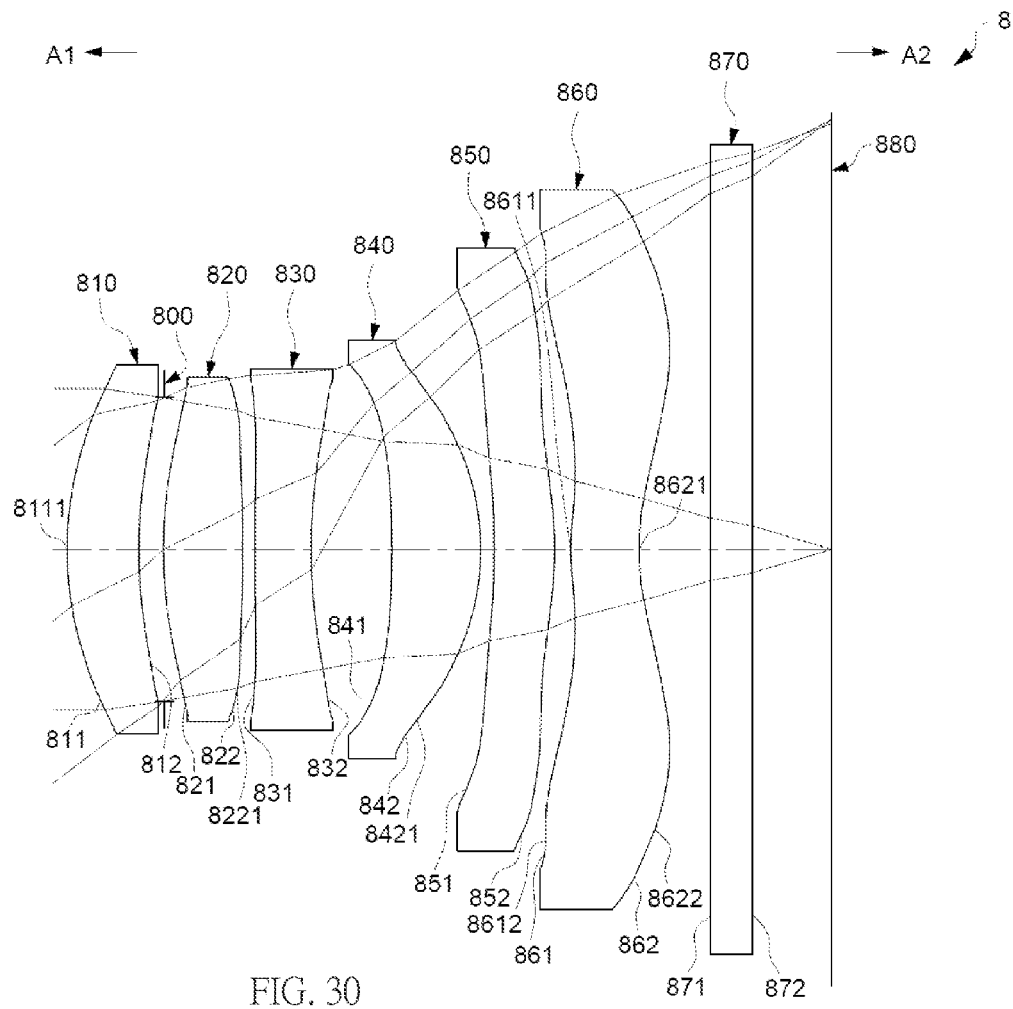
FIG. 30 is a cross-sectional view of an eighth embodiment of an optical imaging lens having six lens elements according to the present disclosure.
Figure 31:
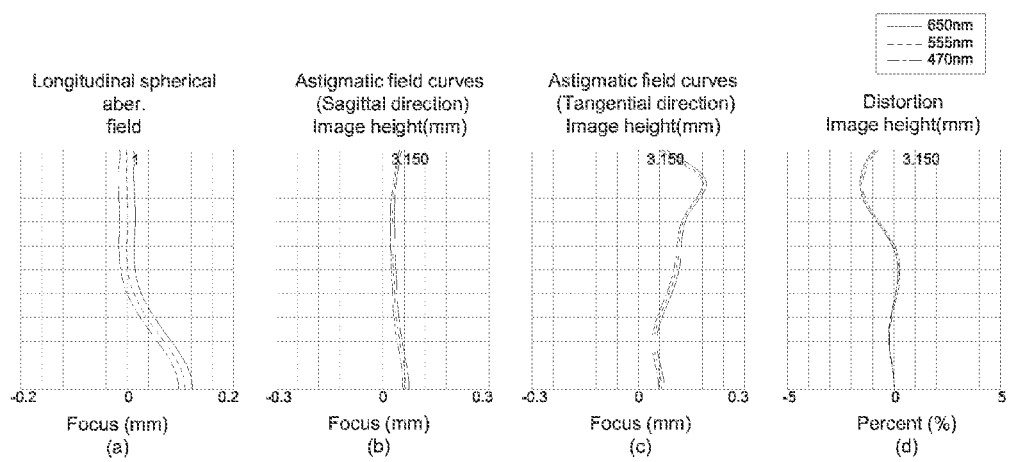
FIG. 31 is a chart of longitudinal spherical aberration and other kinds of optical aberrations of an eighth embodiment of the optical imaging lens according the present disclosure.

Reference is now made to FIGS. 30-33. FIG. 30 illustrates an example cross-sectional view of an optical imaging lens 8 having six lens elements of the optical imaging lens according to an eighth example embodiment. FIG. 31 shows example charts of longitudinal spherical aberration and other kinds of optical aberrations of the optical imaging lens 8 according to the eighth embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the optical imaging lens 8 of the present embodiment, in an order from an object side A1 to an image side A2 along an optical axis, comprises a first lens element 810, an aperture stop 800, a second lens element 820, a third lens element 830, a fourth lens element 840, a fifth lens element 850 and a sixth lens element 860.

The differences between the eighth embodiment and the first embodiment are the radius of curvature and thickness of each lens element, the distance of each air gap and the configuration of the concave/convex shape of object-side surface 861, but the configuration of the positive/negative refracting power of the first, second, third, fourth, fifth and sixth lens elements 810, 820, 830, 840, 850, 860 and configuration of the concave/convex shape of surfaces, comprising the object-side surfaces 811, 821, 831, 841, 851 facing to the object side A1 and the image-side surfaces 812, 822, 832, 842, 852, 862 facing to the image side A2, are similar to those in the first embodiment. Specifically, the object-side surface 861 of the sixth lens element 860 comprises a convex portion 8611 in a vicinity of the optical axis and a concave portion 8612 in a vicinity of a periphery of the sixth lens element 860. Please refer to FIG. 32 for the optical characteristics of each lens elements in the optical imaging lens 8 of the present embodiment, wherein the values of (CT4+AC34)/CT3, AC34/(AC45+AC56), (CT1+AC34)/CT6, AC34/CT3, (CT2+CT4)/CT6, AC34/AC23, (CT1+CT2)/CT6, AC34/CT6, (CT1+AC34)/CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 are:

$(CT4+AC34)/CT3=2.99;$ $AC34/(AC45+AC56)=2.29;$ $(CT1+AC34)/CT6=2.37;$ $AC34/CT3=1.42;$ $(CT2+CT4)/CT6=2.62;$ $AC34/AC23=6.12;$ $(CT1+CT2)/CT6=2.36;$ $AC34/CT6=1.25;$ $(CT1+AC34)/CT3=2.70;$ $AC12/AC45=1.82;$ $(CT2+CT4)/CT5=2.77;$ $(CT1+AC34)/CT5=2.51;$ $AC34/(AC23+AC56)=2.33;$ $AC34/CT5=1.32;$ $CT4/(AC23+AC56)=2.58;$ $(CT2+AC34)/CT3=2.82;$ $(CT1+CT4)/CT5=2.66.$

The distance from the object-side surface 811 of the first lens element 810 to the image plane 880 along the optical axis is 5.40 mm and the length of the optical imaging lens 8 is shortened.

As shown in FIG. 31, the optical imaging lens 8 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 8 is effectively shortened.

Figure 34:
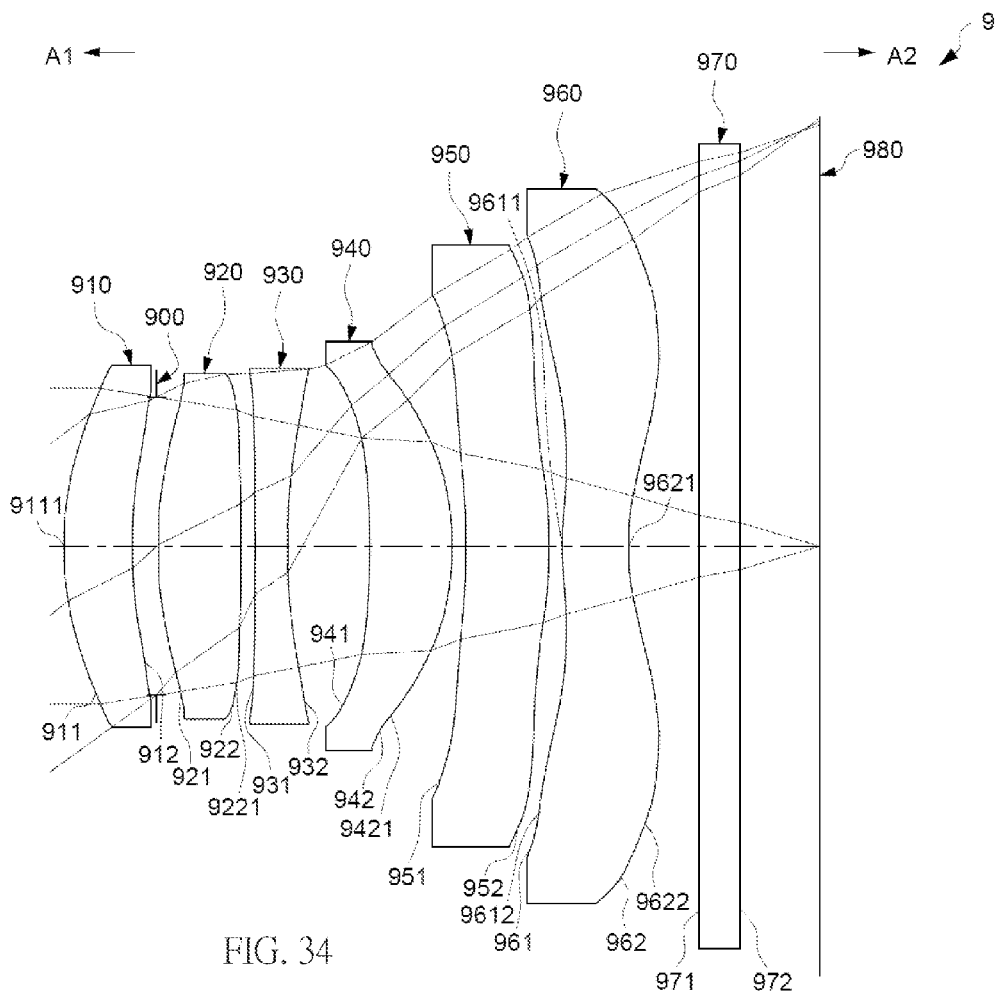
FIG. 34 is a cross-sectional view of a ninth embodiment of an optical imaging lens having six lens elements according to the present disclosure.
Figure 35:
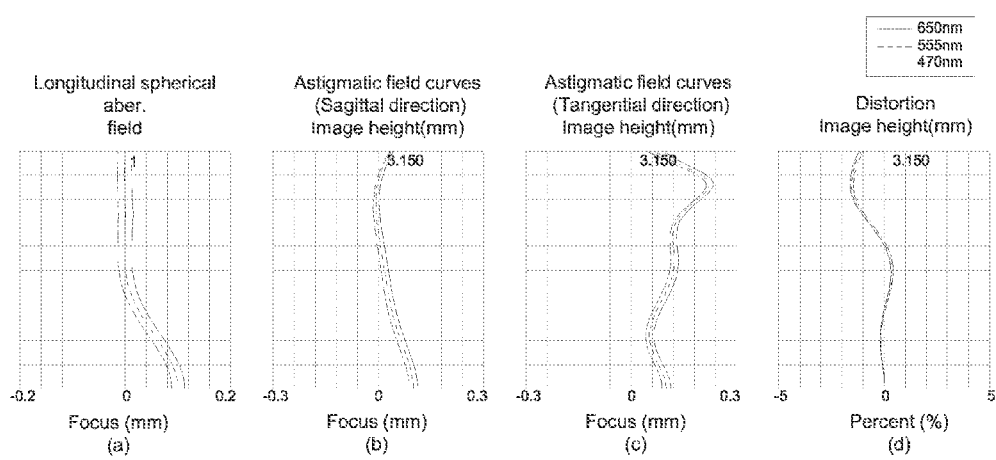
FIG. 35 is a chart of longitudinal spherical aberration and other kinds of optical aberrations of a ninth embodiment of the optical imaging lens according the present disclosure.

Reference is now made to FIGS. 34-37. FIG. 34 illustrates an example cross-sectional view of an optical imaging lens 9 having six lens elements of the optical imaging lens according to a ninth example embodiment. FIG. 35 shows example charts of longitudinal spherical aberration and other kinds of optical aberrations of the optical imaging lens 9 according to the ninth embodiment. FIG. 36 shows an example table of optical data of each lens element of the optical imaging lens 9 according to the ninth example embodiment. FIG. 37 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 34, the optical imaging lens 9 of the present embodiment, in an order from an object side A1 to an image side A2 along an optical axis, comprises a first lens element 910, an aperture stop 900, a second lens element 920, a third lens element 930, a fourth lens element 940, a fifth lens element 950 and a sixth lens element 960.

The differences between the ninth embodiment and the first embodiment are the radius of curvature and thickness of each lens element, the distance of each air gap and the configuration of the concave/convex shape of object-side surface 961, but the configuration of the positive/negative refracting power of the first, second, third, fourth, fifth and sixth lens elements 910, 920, 930, 940, 950, 960 and configuration of the concave/convex shape of surfaces, comprising the object-side surfaces 911, 921, 931, 941, 951 facing to the object side A1 and the image-side surfaces 912, 922, 932, 942, 952, 962 facing to the image side A2, are similar to those in the first embodiment. Specifically, the object-side surface 961 of the sixth lens element 960 comprises a convex portion 9611 in a vicinity of the optical axis and a concave portion 9612 in a vicinity of a periphery of the sixth lens element 960. Please refer to FIG. 36 for the optical characteristics of each lens elements in the optical imaging lens 9 of the present embodiment, wherein the values of (CT4+AC34)/CT3, AC34/(AC45+AC56), (CT1+AC34)/CT6, AC34/CT3, (CT2+CT4)/CT6, AC34/AC23, (CT1+CT2)/CT6, AC34/CT6, (CT1+AC34)/CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 are:

$(CT4+AC34)/CT3=5.05;$ $AC34/(AC45+AC56)=2.72;$ $(CT1+AC34)/CT6=2.42;$ $AC34/CT3=2.51;$ $(CT2+CT4)/CT6=2.67;$ $AC34/AC23=6.26;$ $(CT1+CT2)/CT6=2.43;$ $AC34/CT6=1.32;$ $(CT1+AC34)/CT3=4.60;$ $AC12/AC45=1.98;$ $(CT2+CT4)/CT5=1.98;$ $(CT1+AC34)/CT5=1.80;$ $AC34/(AC23+AC56)=2.72;$ $AC34/CT5=0.98;$ $CT4/(AC23+AC56)=2.75;$ $(CT2+AC34)/CT3=5.05;$ $(CT1+CT4)/CT5=1.81.$

The distance from the object-side surface 911 of the first lens element 910 to the image plane 980 along the optical axis is 5.40 mm and the length of the optical imaging lens 9 is shortened.

As shown in FIG. 35, the optical imaging lens 9 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 9 is effectively shortened.

Figure 38:
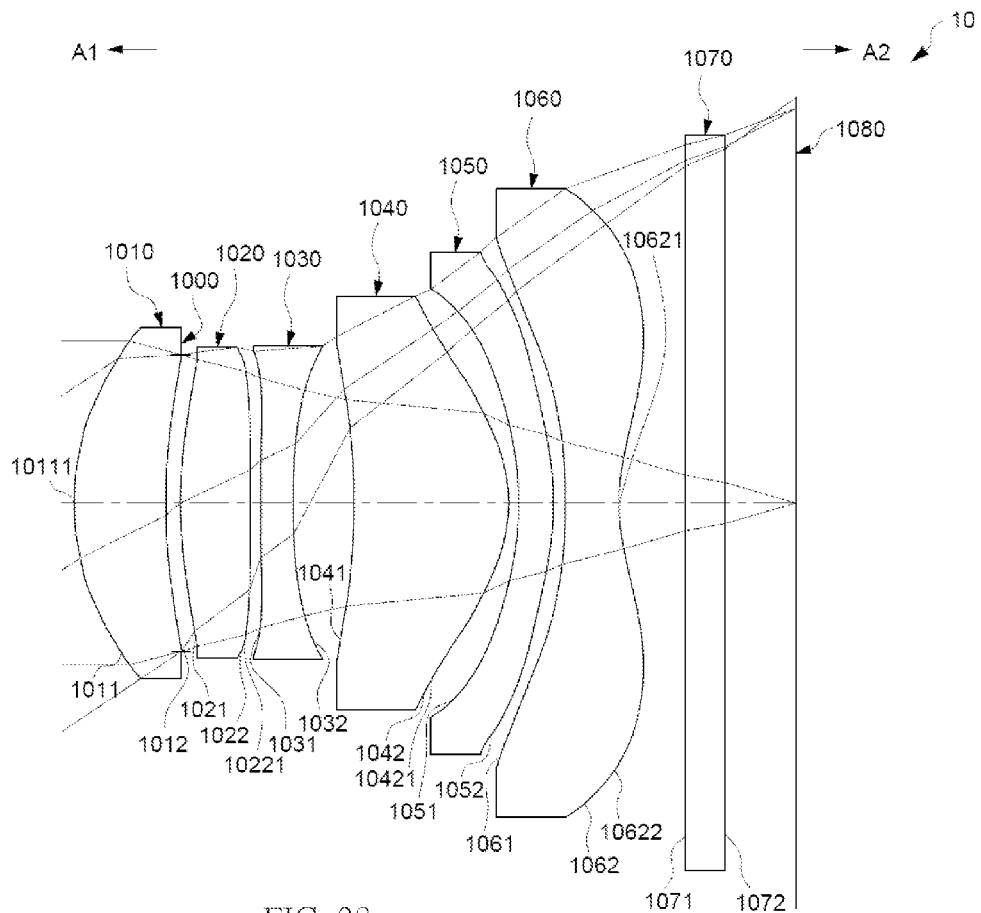
FIG. 38 is a cross-sectional view of a tenth embodiment of an optical imaging lens having six lens elements according to the present disclosure.
Figure 39:
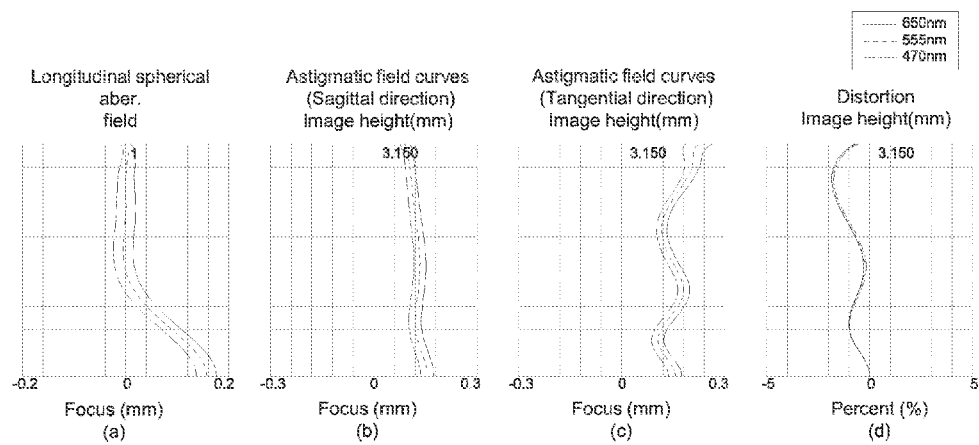
FIG. 39 is a chart of longitudinal spherical aberration and other kinds of optical aberrations of a tenth embodiment of the optical imaging lens according the present disclosure.

Reference is now made to FIGS. 38-41. FIG. 38 illustrates an example cross-sectional view of an optical imaging lens 10 having six lens elements of the optical imaging lens according to a tenth example embodiment. FIG. 39 shows example charts of longitudinal spherical aberration and other kinds of optical aberrations of the optical imaging lens 10 according to the tenth embodiment. FIG. 40 shows an example table of optical data of each lens element of the optical imaging lens 10 according to the tenth example embodiment. FIG. 41 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 38, the optical imaging lens 10 of the present embodiment, in an order from an object side A1 to an image side A2 along an optical axis, comprises a first lens element 1010, an aperture stop 1000, a second lens element 1020, a third lens element 1030, a fourth lens element 1040, a fifth lens element 1050 and a sixth lens element 1060.

The differences between the tenth embodiment and the first embodiment are the radius of curvature and thickness of each lens element, the distance of each air gap and the configuration of the concave/convex shape of object-side surface 1061, but the configuration of the positive/negative refracting power of the first, second, third, fourth, fifth and sixth lens elements 1010, 1020, 1030, 1040, 1050, 1060 and configuration of the concave/convex shape of surfaces, comprising the object-side surfaces 1011, 1021, 1031, 1041, 1051 facing to the object side A1 and the image-side surfaces 1012, 1022, 1032, 1042, 1052, 1062 facing to the image side A2, are similar to those in the first embodiment. Specifically, the object-side surface 1061 of the sixth lens element 1060 is a concave surface. Please refer to FIG. 40 for the optical characteristics of each lens elements in the optical imaging lens 10 of the present embodiment, wherein the values of (CT4+AC34)/CT3, AC34/(AC45+AC56), (CT1+AC34)/CT6, AC34/CT3, (CT2+CT4)/CT6, AC34/AC23, (CT1+CT2)/CT6, AC34/CT6, (CT1+AC34)/CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 are:

$(CT4+AC34)/CT3=6.86;$ $AC34/(AC45+AC56)=2.14;$ $(CT1+AC34)/CT6=2.61;$ $AC34/CT3=1.66;$ $(CT2+CT4)/CT6=3.83;$ $AC34/AC23=3.96;$ $(CT1+CT2)/CT6=2.93;$ $AC34/CT6=0.85;$ $(CT1+AC34)/CT3=5.11;$ $AC12/AC45=1.07;$ $(CT2+CT4)/CT5=6.14;$ $(CT1+AC34)/CT5=4.19;$ $AC34/(AC23+AC56)=2.01;$ $AC34/CT5=1.36;$ $CT4/(AC23+AC56)=6.32;$ $(CT2+AC34)/CT3=3.95;$ $(CT1+CT4)/CT5=7.10.$

The distance from the object-side surface 1011 of the first lens element 1010 to the image plane 1080 along the optical axis is 5.40 mm and the length of the optical imaging lens 10 is shortened.

As shown in FIG. 35, the optical imaging lens 10 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 10 is effectively shortened.

Please refer to FIG. 42, which shows the values of (CT4+AC34)/CT3, AC34/(AC45+AC56), (CT1+AC34)/CT6, AC34/CT3, (CT2+CT4)/CT6, AC34/AC23, (CT1+CT2)/CT6, AC34/CT6, (CT1+AC34)/CT3, AC12/AC45, (CT2+CT4)/CT5, (CT1+AC34)/CT5, AC34/(AC23+AC56), AC34/CT5, CT4/(AC23+AC56), (CT2+AC34)/CT3 and (CT1+CT4)/CT5 of all nine embodiments, and it is clear that the optical imaging lens of the present invention satisfy the Equations (1), (2), (3), (4), (5), (6), (7), (8), (9), (10), (11), (12)/(12'), (13), (14), (15), (16) and/or (17).

Figure 43:
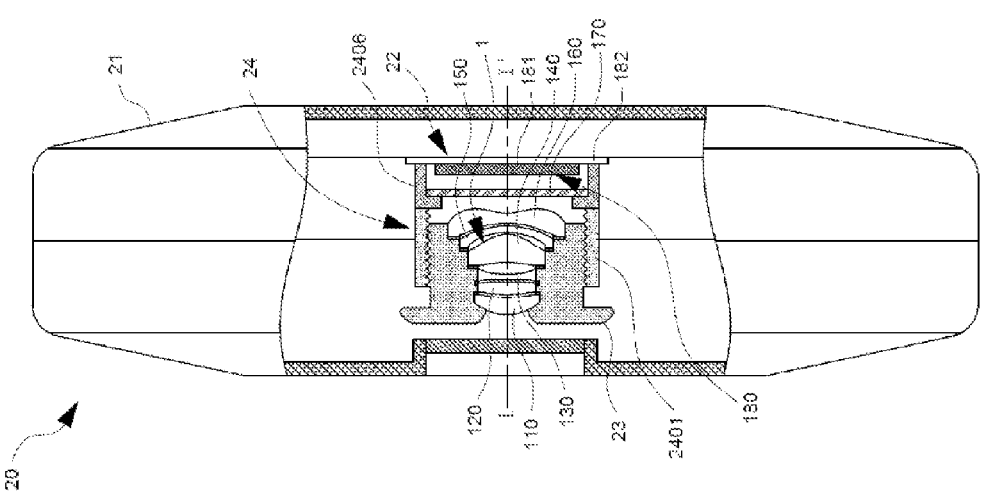
FIG. 43 is a structure of an example embodiment of a mobile device.

Reference is now made to FIG. 43, which illustrates an example structural view of a first embodiment of mobile device 20 applying an aforesaid optical imaging lens. The mobile device 20 comprises a housing 21 and a photography module 22 positioned in the housing 21. Examples of the mobile device 20 may be, but are not limited to, a mobile phone, a camera, a tablet computer, a personal digital assistant (PDA), etc.

As shown in FIG. 43, the photography module 22 may comprise an aforesaid optical imaging lens with six lens elements, which is a prime lens and for example the optical imaging lens 1 of the first embodiment, a lens barrel 23 for positioning the optical imaging lens 1, a module housing unit 24 for positioning the lens barrel 23, a substrate 182 for positioning the module housing unit 24, and an image sensor 181 which is positioned at an image side of the optical imaging lens 1. The image plane 180 is formed on the image sensor 181.

In some other example embodiments, the structure of the filtering unit 170 may be omitted. In some example embodiments, the housing 21, the lens barrel 23, and/or the module housing unit 24 may be integrated into a single component or assembled by multiple components. In some example embodiments, the image sensor 181 used in the present embodiment is directly attached to a substrate 182 in the form of a chip on board (COB) package, and such package is different from traditional chip scale packages (CSP) since COB package does not require a cover glass before the image sensor 181 in the optical imaging lens 1. Aforesaid exemplary embodiments are not limited to this package type and could be selectively incorporated in other described embodiments.

The six lens elements 110, 120, 130, 140, 150, 160 are positioned in the lens barrel 23 in the way of separated by an air gap between any two adjacent lens elements.

The module housing unit 24 comprises a lens backseat 2401 for positioning the lens barrel 23 and an image sensor base 2406 positioned between the lens backseat 2401 and the image sensor 181. The lens barrel 23 and the lens backseat 2401 are positioned along a same axis I-I', and the lens backseat 2401 is close to the outside of the lens barrel 23. The image sensor base 2406 is exemplarily close to the lens backseat 2401 here. The image sensor base 2406 could be optionally omitted in some other embodiments of the present invention.

Because the length of the optical imaging lens 1 is merely 5.32 mm, the size of the mobile device 20 may be quite small. Therefore, the embodiments described herein meet the market demand for smaller sized product designs.

Figure 44:
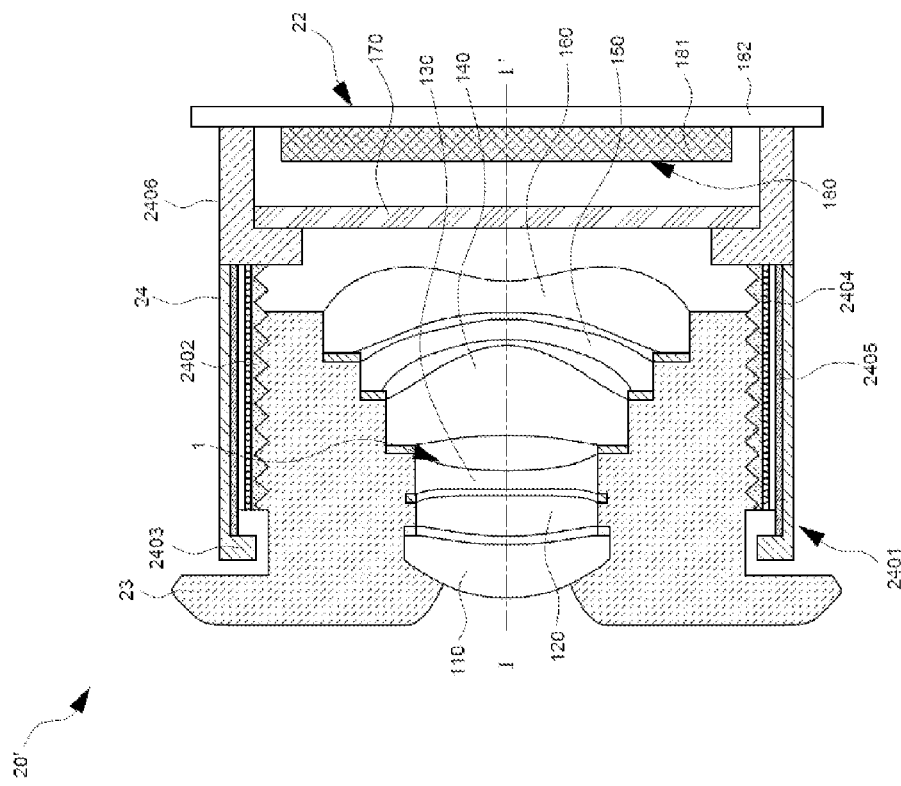
FIG. 44 is a partially enlarged view of the structure of another example embodiment of a mobile device.

Reference is now made to FIG. 44, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1, 5.32 mm, is shortened, the mobile device 20' may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling the detail structure and/or reflection power of the lens elements, the length of the optical imaging lens is effectively shortened and meanwhile good optical characters are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising a first lens element, an aperture stop, and second, third, fourth, fifth and sixth lens elements, each of said first, second, third, fourth, fifth and sixth lens elements having refracting power, an object-side surface facing toward the object side and an image-side surface facing toward the image side, wherein:
    said object-side surface of said first lens element comprises a convex portion in a vicinity of the optical axis, and said image-side surface of said first lens element is a concave surface;
    said image-side surface of said second lens element comprises a convex portion in a vicinity of a periphery of the second lens element;
    said third lens element has negative refracting power, and said image side of said third lens element comprises a concave portion in a vicinity of a periphery of said third lens element;
    said image-side surface of said fourth lens element comprises a convex portion in a vicinity of a periphery of the fourth lens element;
    said image-side surface of said sixth lens element comprises a concave portion in a vicinity of the optical axis and a convex portion in a vicinity of a periphery of the sixth lens element;
    the optical imaging lens as a whole comprises only the six lens elements having refracting power;
    the absolute value of the difference between an Abbe number of said third lens element and an Abbe number of said fourth lens element is greater than or equal to 20;
    a central thickness of the first lens element along the optical axis is CT1, a central thickness of the third lens element along the optical axis is CT3, an air gap between the third lens element and the fourth lens element along the optical axis is AC34, and CT1, CT3 and AC34 satisfy the equation:

$$2.20 \le (CT1+AC34)/CT3; \text{ and}$$

wherein an air gap between the fourth lens element and the fifth lens element along the optical axis is AC45, an air gap between the fifth lens element and the sixth lens element along the optical axis is AC56, and AC34, AC45 and AC56 satisfy the equation:

$$1.00 \le AC34/(AC45+AC56).$$

2. The optical imaging lens according to claim 1, wherein a central thickness of the fourth lens element along the optical axis is CT4, and CT3, CT4 and AC34 satisfy the equation:

$$2.20 \le (CT4+AC34)/CT3.$$

3. The optical imaging lens according to claim 1, wherein a central thickness of the sixth lens element along the optical axis is CT6, and AC34, CT1 and CT6 satisfy the equation:

$$2.00 \le (CT1+AC34)/CT6.$$

4. The optical imaging lens according to claim 1, wherein CT3 and AC34 satisfy the equation:

$$1.60 \le AC34/CT3.$$

5. The optical imaging lens according to claim 4, wherein a central thickness of the second lens element along the optical axis is CT2, a central thickness of the sixth lens element along the optical axis is CT6, and CT2, CT4 and CT6 satisfy the equation:

$$2.48 \le (CT2+CT4)/CT6.$$

6. The optical imaging lens according to claim 1, wherein an air gap between the second lens element and the third lens element along the optical axis is AC23, and AC23 and AC34 satisfy the equation:

$$3.30 \le AC34/AC23.$$

7. The optical imaging lens according to claim 6, wherein a central thickness of the second lens element along the optical axis is CT2, a central thickness of the sixth lens element along the optical axis is CT6, and CT1, CT2 and CT6 satisfy the equation:

$$2.00 \le (CT1+CT2)/CT6.$$

8. The optical imaging lens according to claim 2, wherein a central thickness of the sixth lens element along the optical axis is CT6, and AC34 and CT6 satisfy the equation:

$$1.00 \le AC34/CT6.$$

9. The optical imaging lens according to claim 1, wherein an air gap between the first lens element and the second lens element along the optical axis is AC12, and AC12 and AC45 satisfy the equation:

$$0.90 \le AC12/AC45.$$

10. The optical imaging lens according to claim 9, wherein a central thickness of the second lens element along the optical axis is CT2, a central thickness of the fourth lens element along the optical axis is CT4, a central thickness of the fifth lens element along the optical axis is CT5, and CT2, CT4 and CT5 satisfy the equation:

$1.70 \leq (CT2+CT4)/CT5$.

11. The optical imaging lens according to claim 1, wherein a central thickness of the fifth lens element along the optical axis is CT5, and CT1, CT5 and AC34 satisfy the equation:

$1.80 \leq (CT1+AC34)/CT5$.

12. The optical imaging lens according to claim 11, wherein an air gap between the second lens element and the third lens element along the optical axis is AC23, and AC23, AC34 and AC56 satisfy the equation:

$1.80 \leq AC34/(AC23+AC56)$.

13. The optical imaging lens according to claim 1, wherein a central thickness of the fifth lens element along the optical axis is CT5, and CT5 and AC34 satisfy the equation:

$1.00 \leq AC34/CT5$.

14. The optical imaging lens according to claim 1, wherein a central thickness of the fourth lens element along the optical axis is CT4, an air gap between the second lens element and the third lens element along the optical axis is AC23, and CT4, AC23 and AC56 satisfy the equation:

$1.00 \leq CT4/(AC23+AC56)$.

15. The optical imaging lens according to claim 14, wherein a central thickness of the second lens element along the optical axis is CT2, and CT2, CT3 and AC34 satisfy the equation:

$2.80 \leq (CT2+AC34)/CT3$.

16. The optical imaging lens according to claim 15, a central thickness of the fifth lens element along the optical axis is CT5, and CT1, CT4 and CT5 satisfy the equation:

$1.80 \leq (CT1+CT4)/CT5$.

17. The optical imaging lens according to claim 1, wherein said object-side surface of said fourth lens element comprises a convex portion in a vicinity of the optical axis.

18. A mobile device, comprising:
  a housing; and
  a photography module positioned in the housing and comprising:
    the optical imaging lens as claimed in claim 1;
    a lens barrel for positioning the optical imaging lens;
    a module housing unit for positioning the lens barrel; and
    an image sensor positioned at the image side of the optical imaging lens.

* * * * *